US008056219B2

(12) United States Patent
Wojcik et al.

(10) Patent No.: US 8,056,219 B2

(45) Date of Patent: Nov. 15, 2011

(54) ONE PORT PLUG UNLOCKING TOOL

(75) Inventors: Alan F. Wojcik, Cedar Lake, IN (US); Paul B. Ducharme, New Lenox, IL (US); Mark Shurhay, Westchester, IL (US)

(73) Assignee: Panduit Corp., Tinley Park, IL (US)

( * ) Notice: Subject to any disclaimer, the term of this patent is extended or adjusted under 35 U.S.C. 154(b) by 689 days.

(21) Appl. No.: 12/013,225

(22) Filed: Jan. 11, 2008

(65) Prior Publication Data

US 2009/0178265 A1 Jul. 16, 2009

Related U.S. Application Data

(60) Provisional application No. 60/943,413, filed on Jun. 12, 2007, provisional application No. 60/992,450, filed on Dec. 5, 2007.

(51) Int. Cl.
*B23P 19/00* (2006.01)

(52) U.S. Cl. ................ 29/764; 29/739; 29/747; 29/758; 81/52

(58) Field of Classification Search .................... 29/764, 29/235, 426.5, 426.6, 739, 747, 758, 762, 29/854, 857; 81/52, 111, 120, 176.1
See application file for complete search history.

(56) References Cited

U.S. PATENT DOCUMENTS

| | | | |
|---|---|---|---|
| 3,769,680 A | 11/1973 | Anhalt | |
| 3,951,514 A | 4/1976 | Medina, Jr. | |
| 4,083,101 A | 4/1978 | Coller | |
| 4,380,118 A | 4/1983 | Driver et al. | |
| 4,425,704 A | 1/1984 | Cline | |
| 4,577,400 A | 3/1986 | Morgan | |
| 4,920,637 A | 5/1990 | Meyerhoefer et al. | |
| 5,210,934 A | 5/1993 | Lenzi et al. | |
| 5,402,562 A | 4/1995 | Saito et al. | |
| 5,758,403 A * | 6/1998 | Fallandy | 29/566.4 |
| 6,524,133 B2 | 2/2003 | Murakami | |
| 6,556,665 B1 | 4/2003 | Suzuki | |
| 6,817,089 B2 | 11/2004 | Whitehead | |
| 7,257,888 B2 | 8/2007 | Nelson et al. | |
| 7,644,485 B2 * | 1/2010 | Muller et al. | 29/566.4 |
| 2007/0011857 A1 | 1/2007 | Francis et al. | |

FOREIGN PATENT DOCUMENTS

JP 2002151229 A 5/2002

* cited by examiner

*Primary Examiner* — Thiem Phan

(74) *Attorney, Agent, or Firm* — Robert A. McCann; Christopher S. Clancy; James H. Williams

(57) ABSTRACT

The present invention involves a plug unlocking tool which comprises a housing and a probe connected to housing wherein the probe extends in a direction away from the housing. The tool further includes a first and second latch release fingers associated with the housing wherein the first and second latch release fingers are movable relative to the housing and an actuator positioned within and moveable along a slot defined in the housing wherein the actuator is associated with the first and second latch release fingers to impart movement of at least one of the first and second latch release fingers with movement of the actuator along the slot. In addition, the present invention includes a method for unlocking a plug from an electrical connection with the plug positioned within a plug cassette assembly and for unlocking the plug from the plug cassette assembly utilizing the plug unlocking tool.

18 Claims, 20 Drawing Sheets

ONE PORT PLUG UNLOCKING TOOL

CROSS-REFERENCE TO RELATED APPLICATION

This application claims priority to U.S. Provisional Application No. 60/943,413, filed Jun. 12, 2007 and U.S. Provisional Application No. 60/992,450 , filed Dec. 5, 2007.

FIELD OF INVENTION

This invention relates generally to a tool for unlocking a plug from its electrical connection and is particularly directed to a tool for unlocking a plug from its electrical connection with the plug positioned within a gang-type plug cassette and for unlocking the plug from a locked position within the cassette.

SUMMARY OF THE INVENTION

A plug unlocking tool which comprises a housing and a probe connected to housing wherein the probe extends in a direction away from the housing. The tool further comprises a first and second latch release fingers associated with the housing wherein the first and second latch release fingers are movable relative to the housing. The tool additionally comprises an actuator positioned within and moveable along a slot defined in the housing wherein the actuator is associated with the first and second latch release fingers to impart movement of at least one of the first and second latch release fingers with movement of the actuator along the slot.

This invention further includes a method for unlocking a plug from an electrical connection and from a plug cassette assembly. The method comprises the step of providing a tool which comprises a fixed probe connected to a housing and a first and second moveable latch release fingers associated with the housing which are moveable relative to the housing and are associated with an actuator which is capable of imparting movement to the first and second fingers. The method further comprises inserting the probe into a slot defined in a plug cassette assembly wherein the slot is aligned with a latch of the plug to be unlocked from electrical connection, wherein the first moveable latch release finger is positioned aligned with a back wall of the plug cassette assembly and the second latch release finger is positioned aligned with another slot defined by the plug cassette assembly. The method includes moving the probe within the slot, engaging the latch of the plug with the probe and unlocking the plug from electrical connection and includes moving the actuator causing the second latch release finger to move within the other slot engaging the locking clip with second latch release finger unlocking the plug from the plug cassette assembly.

DETAILED DESCRIPTION

Figure 1:
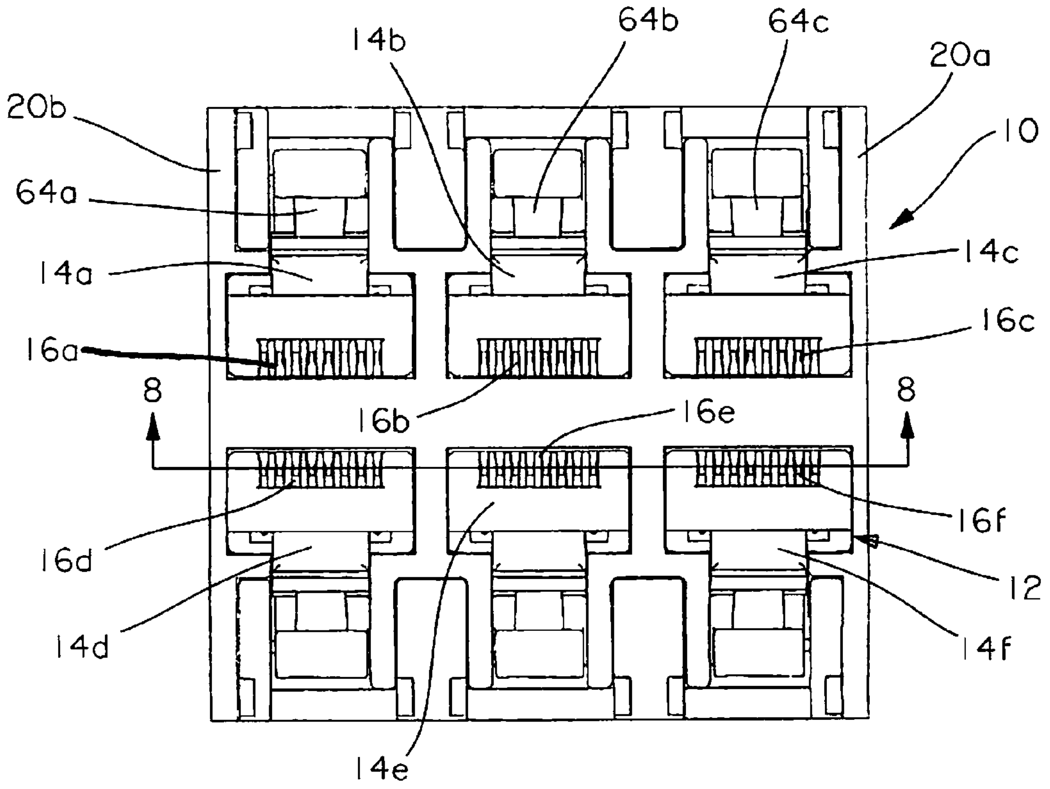
FIG. 1 is a front plan view of one example of a quick release plug cassette assembly with multiple cables connected thereto.
Figure 2:
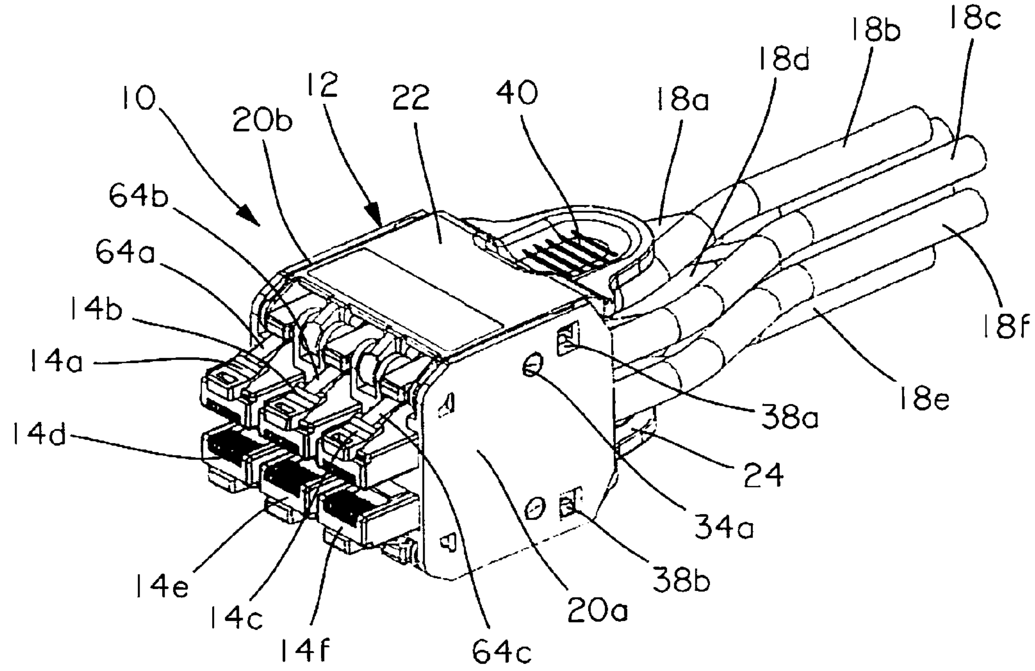
FIG. 2 is an upper front perspective view of the quick release plug cassette assembly of FIG. 1.
Figure 3:
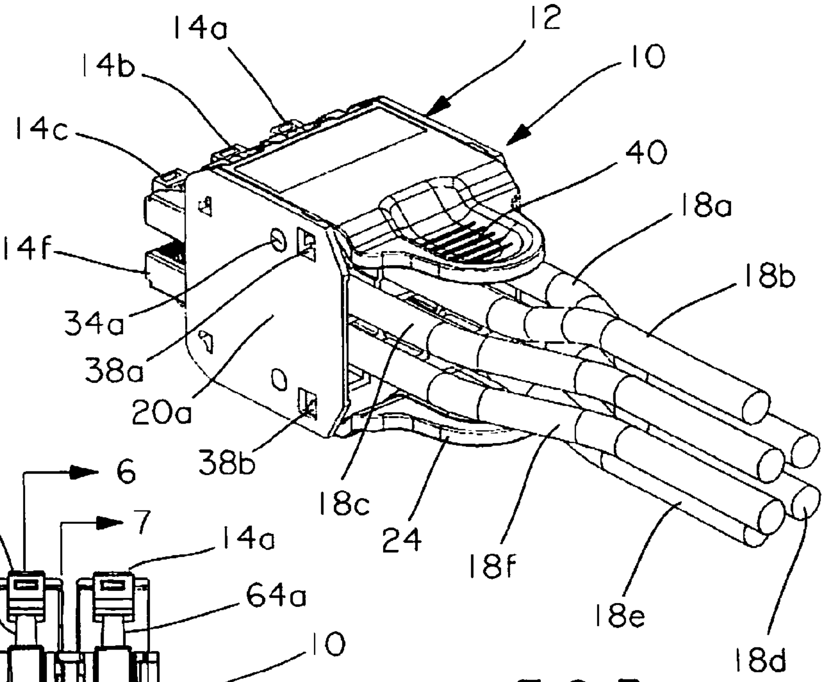
FIG. 3 is an upper rear perspective view of the quick release plug cassette assembly of FIG. 1.
Figure 4:
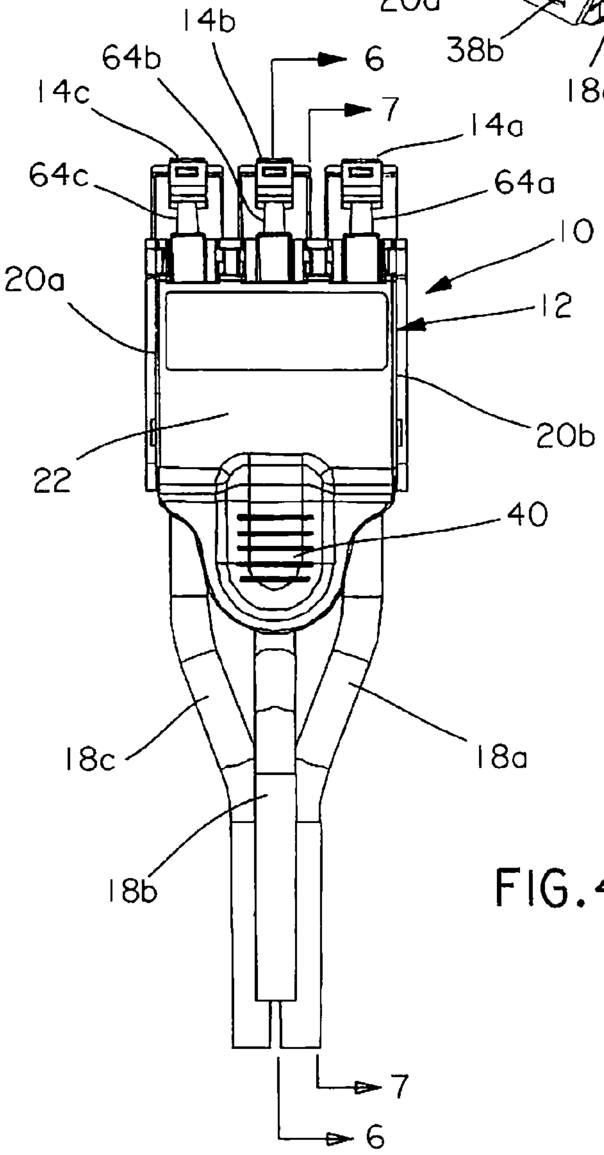
FIG. 4 is a top plan view of the quick release plug cassette assembly of FIG. 1.
Figure 5:
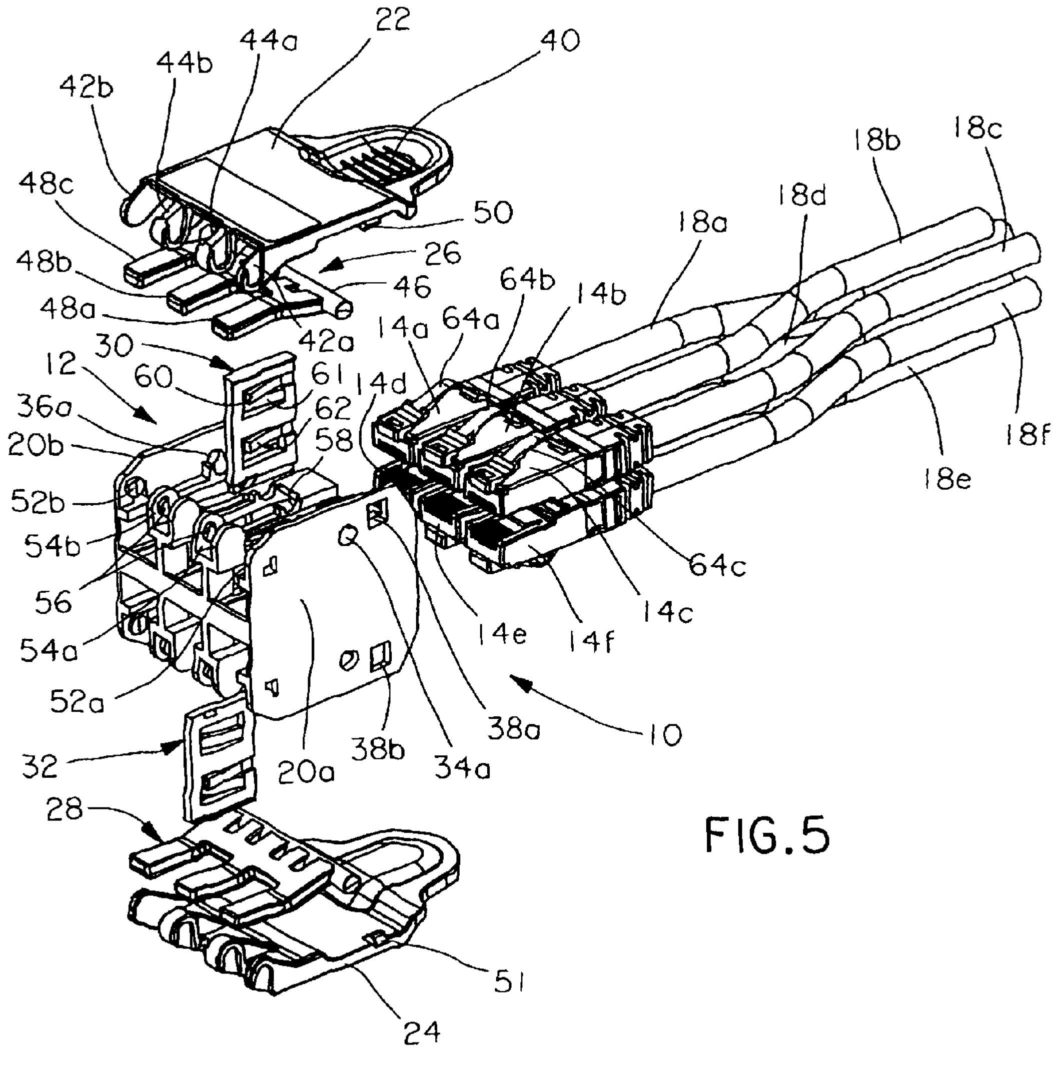
FIG. 5 is an exploded perspective view of the quick release plug cassette assembly of FIG. 2.
Figure 6:
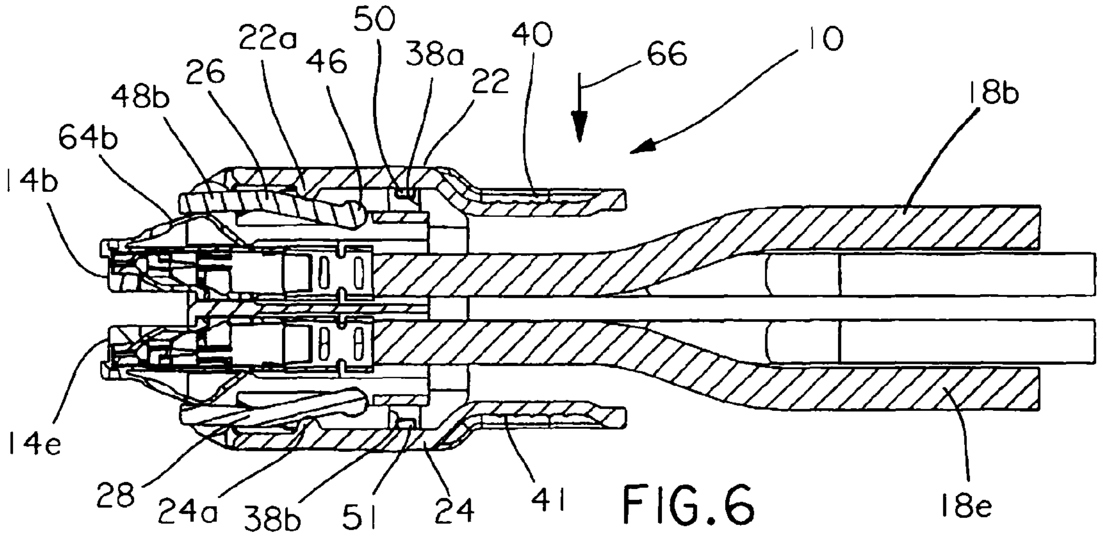
FIG. 6 is a sectional view of the quick release plug cassette assembly shown in FIG. 4 taken along site line 6-6 therein.
Figure 7:
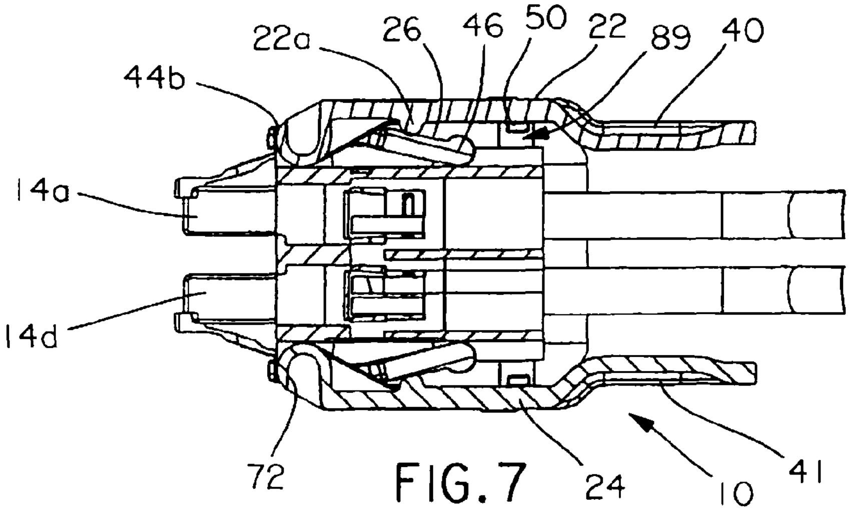
FIG. 7 is a sectional view of the quick release plug cassette assembly shown in FIG. 4 taken along site line 7-7 therein.

As shown in FIGS. 1-8, in one example, the quick release plug cassette assembly 10 includes a generally rectangular housing 12 preferably comprised of a high strength plastic. Housing 12 includes first and second generally planar sidewalls 20*a* and 20*b* which are connected by various internal structures illustrated in the various figures and described below to form a rigid structure. Attached to respective upper and lower portions of the first and second sidewalls 20*a* and 20*b* are an upper release lever 22 and a lower release lever 24.

Housing 12 is adapted to receive first through sixth patch cord plugs 14*a*-14*f*. Each of the plugs 14*a*-14*f* is coupled to a respective end of first through sixth patch cord cables 18*a*-18*f*. Each of the first through sixth plugs 14*a*-14*f* includes respective sets of electrical contacts 16*a*-16*f* for electrical connection to complementary sets of electrical contacts in switches which are not shown in the figures for simplicity.

The upper and lower release levers 22 and 24 are identical in configuration, operation and positioning within housing 12. Therefore, only the upper release lever 22 will be described in detail herein. Upper release lever 22 includes a generally flat extended portion having on a first forward end thereof plural connecting elements. These connecting elements include first and second outer, or edge, pivoting connectors 42*a* and 42*b* and first and second inner pivoting connectors 44*a* and 44*b*. Each of the first and second outer pivoting connectors 42*a* and 42*b* includes a recessed, outer curvilinear portion which is adapted to engage a respective one of first and second outer retaining members 52*a* and 52*b* disposed on the inner surfaces of the first and second sidewalls 20*a* and 20*b*, respectively. The connection between the upper release lever's outer connectors 42*a* and 42*b* with the outer retaining members 52*a* and 52*b* permits the upper release lever 22 to be pivotally displaced within housing 12 about an axis defined by the first and second outer retaining members 52*a* and 52*b*. Each of the first and second inner pivoting connectors 44*a* and 44*b* includes a pair of opposed recessed curvilinear portions. Each of the inner pivoting connectors 44*a* and 44*b* of the upper release lever 22 is adapted for insertion in respective first and second inner retaining members 54*a* and 54*b* disposed in a forward, upper portion of housing 12. The curvilinear portions of each of the first and second inner pivoting connectors 44*a*, 44*b* are adapted to receive a respective one of a pair of inwardly extending projections 56 within the first and second inner retaining members 54*a* and 54*b* for maintaining the pivoting inner connectors securely within the inner retaining members while allowing for pivoting displacement of the upper release lever 22 within housing 12. Also disposed within housing 12 are upper and lower plug release actuators 26 and 28. The upper and lower plug release actuators 26 and 28 are identical in configuration, operation and mounting within housing 12, and thus only the upper plug release actuator is described in detail herein.

The upper plug release actuator 26 includes an aft cylindrical bar 46. Opposed ends of the aft cylindrical bar 46 are adapted for positioning in respective circular apertures 34*a* and 36*a* in the first and second side walls 20*a* and 20*b*. The upper plug release actuator 26 is free to pivot about an axis defined by the aft cylindrical bar 46 and passing through the aligned circular apertures 34*a* and 36*a*. Extending forward from the aft cylindrical bar 46 are first, second and third arms 48*a*, 48*b* and 48*c*. Pivoting displacement of the upper plug release actuator 26 allows for upward and downward movement of the first, second and third forward extending arms 48*a*, 48*b* and 48*c*. The aft cylindrical bar 46 is disposed along its length within plural concave recesses 58 disposed in a spaced manner between the first and second side walls 20*a*, 20*b* of housing 12. The spaced concave recesses 58 provide support for the upper plug release actuator 26 and maintain it in fixed position within housing 12, while allowing it to pivot about the aforementioned axis between circular apertures 34*a* and 36*a*, respectively, in the first and second side walls 20*a*, 20*b* of housing 12. The lower plug release actuator 28 is similarly configured and positioned within housing 12.

Also disposed in housing 12 are first and second inner housing clips 30 and 32. The first and second inner housing clips 30, 32 are inserted either from the top or from the bottom into housing 12 with the upper and lower release levers 22, 24 aligned generally vertically and, once positioned within the housing, are disposed between adjacent, vertically aligned pairs of plugs. Thus, the second inner housing clip 32 is disposed between a first pair of vertically aligned plugs 14*a* and 14*d* and a second pair of vertically aligned plugs 14*b* and 14*e*. Similarly, the first inner housing clip 30 is disposed between the second pair of vertically aligned plugs 14*b* and 14*e* and a third pair of vertically aligned plugs 14*c* and 14*f*. The first and second inner housing clips 30, 32 are identical in configuration and perform the same function within the quick release plug cassette assembly 10 and, thus, only the first inner housing clip 30 is described in detail herein.

The first inner housing clip 30 is generally rectangular and planar in shape and includes first, second and third tabs 60, 61 and 62 extending laterally therefrom. Each of the first, second and third tabs 60, 61 and 62 is adapted to engage a lateral portion of an adjacent plug so as to prevent the plug from being removed from housing 12 when inner housing clip 30 is in position within the housing. Each of the first and third tabs 60, 62 is angled outwardly in a first direction from the plane of the first inner housing clip 30 so as to engage plugs 14*c* and 14*f* and prevent their removal from housing 12. Second tab 61 extends outwardly from the plane of the first inner housing clip 30 in a second, opposed direction to engage and prevent removal of plug 14*b*. Upon insertion of a tool or screwdriver, plugs 14*b*, 14*c* and 14*f* can be removed either individually or as a group from housing 12 by displacing the plug in the direction of the cable to which it is connected without disturbing the remaining plugs.

The quick release plug cassette assembly 10 operates in the following manner to allow for simultaneous connection as well as disconnection of plugs 14*a*-14*f* with a corresponding number of switches. The upper and lower release levers 22 and 24 are engaged such as by the fingers and thumb of a user at respective upper and lower engaging portions 40 and 41. A downward force is applied along and in the direction of arrow 66 to the upper release lever 22, while a corresponding force is applied in the opposite direction to the engaging portion 41 of the lower release lever 24. The upper release lever 22 pivots downwardly about an axis which passes through its pivoting connectors, where one of the inner pivoting connectors 44*b* is shown in the sectional view of FIG. 7. The lower plug release lever 24 undergoes a similar pivoting displacement in an upward direction about its corresponding pivoting connectors, where one of the inner pivoting connectors is shown as element 72 in FIG. 7. As described above, each of these pivoting connectors connects forward portions of the upper and lower release levers 22, 24 to a forward portion of housing 12. Pivoting displacement of the upper and lower release levers 22, 24 is respectively limited by the tabs 50 and 51, respectively, attached to the upper and lower release levers and respectively disposed in sidewall apertures 38*a* and 38*b*. Disposed in the respective inner surfaces of the upper and lower release levers 22, 24 are engaging tabs 22*a* and 24*a*. Displacement of the upper and lower release levers 22, 24 toward one another causes their respective engaging tabs 22*a* and 24*a* to engage the upper and lower plug release actuators 26 and 28, respectively. The upper plug release actuator 26 is pivotably displaced downwardly about its aft cylindrical bar 46 causing its forward extending arms 48*a-c* to engage plug latches 64*a-c* disposed on upper portions of plugs 14*a-c*. Plug latches 64*a-c* are compressed by engagement with the forward extending arms 48*a-c* of the upper plug release actuator 26 allowing the plugs to be withdrawn from their corresponding switches. Lower release lever 24 operates in the same way as upper release lever 22. Lower release lever 24 engages plug release actuator 28 and in turn, the arms associated with actuator 28 compress plug latches of plugs 14*d-f* allowing the plugs to be unlocked and thereafter withdrawn from their corresponding switches. Downward displacement of forward portions of the upper plug release actuator 26 and upward displacement of forward portions of the lower plug release actuator 28 causes corresponding compression of plug latches on each of the six plugs, so as to release all the plugs simultaneously from the switches to which they are connected. Similar operation of the upper and lower release levers 22, 24 and upper and lower plug release actuators 26, 28 combinations is used to simultaneously connect the plural plugs to plural respective switches in accordance with the present invention.

Figure 8:
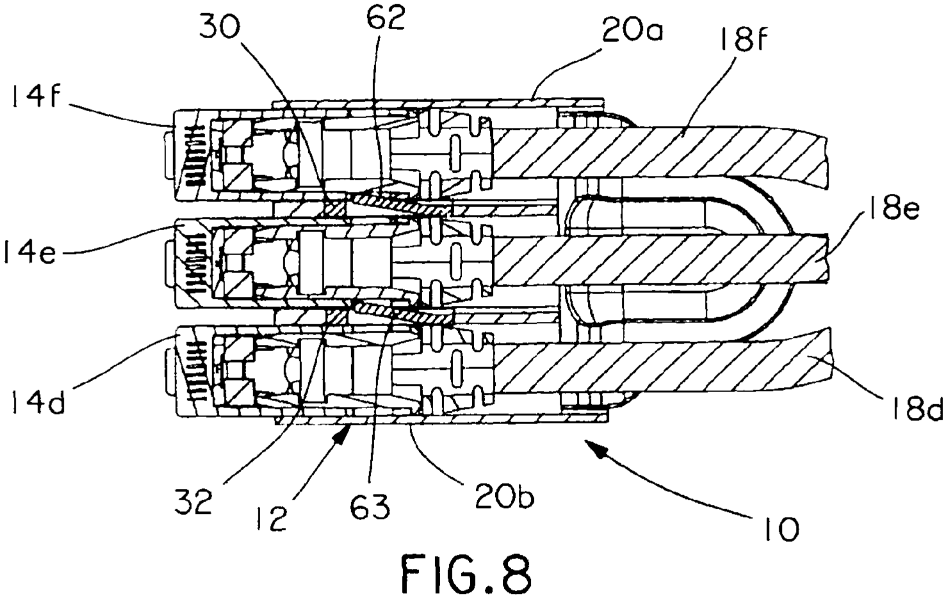
FIG. 8 is a sectional view of the quick release plug cassette assembly shown in FIG. 1 taken along site line 8-8 therein.

Referring to FIG. 8, there is shown a horizontal sectional view of the quick release plug cassette assembly 10 taken along site line 8-8 in FIG. 1, illustrating the position of the first and second inner housing clips 30 and 32 within housing 12. As shown in the figure, the second inner housing clip 32 is disposed between plugs 14*d* and 14*e*, while the first inner housing clip 30 is disposed between plugs 14*e* and 14*f*. A locking tab 63 extending laterally outward from the second inner housing clip 32 engages a lateral portion of plug 14*e* and prevents it from being removed from housing 12. Similarly, the second locking tab 62 extends laterally from the first inner housing clip 30 and engages a lateral portion of plug 14*f* and prevents this plug from being removed from housing 12.

Figure 9:
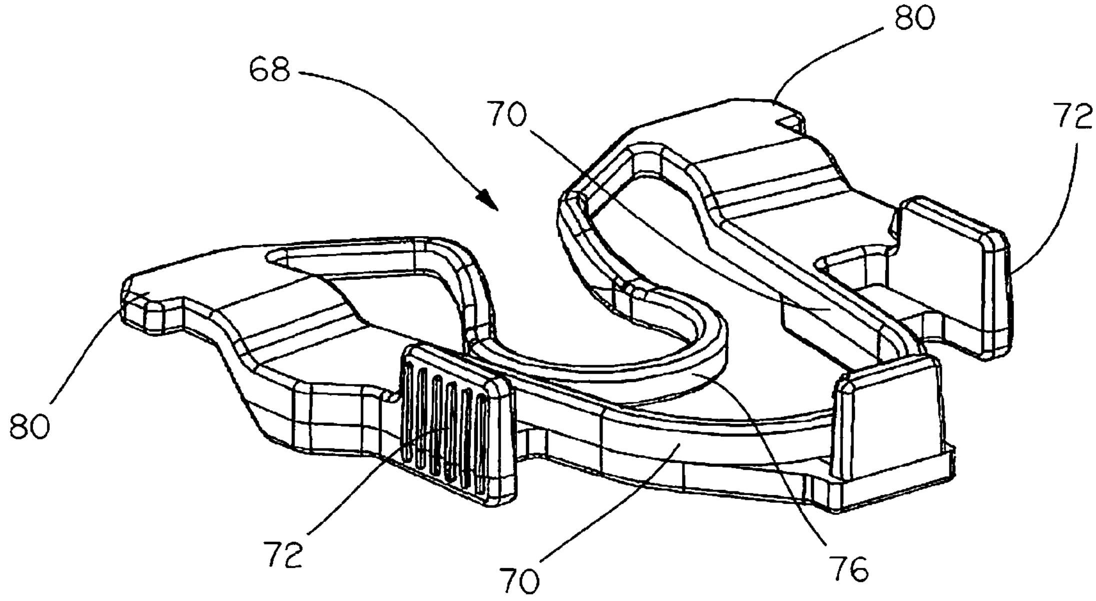
FIG. 9 is a top perspective view of the locking clip of the present invention.
Figure 10:
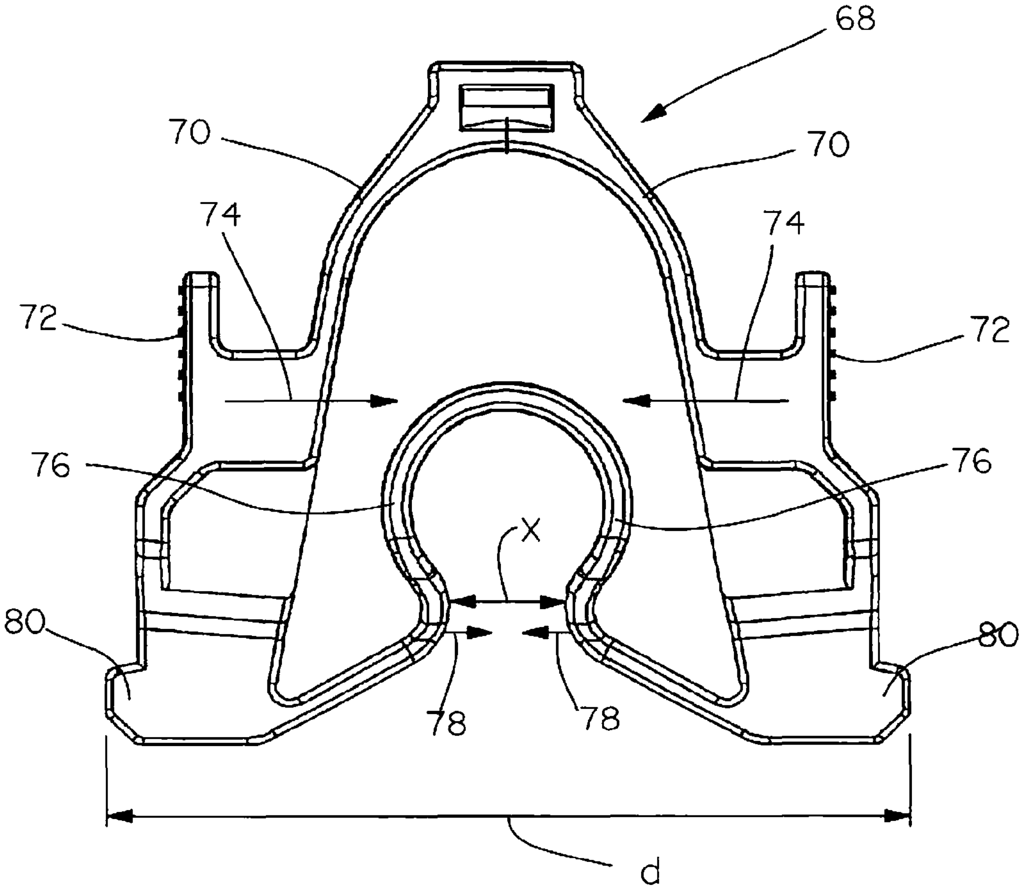
FIG. 10 is a top plan view of the locking clip of FIG. 9.

Another feature of this invention includes a locking clip 68, as shown in FIGS. 9 and 10. Locking clip 68, as will be described in more detail hereinbelow, is inserted into cassette assembly 10 adjacent to one of release levers 22, 24 so as to block that lever from moving in a direction toward the other lever. Both release levers 22, 24 are blocked from such movement if a locking clip 68 is employed with each of release levers 22, 24. If clip 68 is not employed, for example with release lever 22, that particular release lever could be moved in a direction toward the other release lever 24 thereby unlocking row of plugs 14*a*-14*c* from their electrical connection. A like result would occur to row of plugs 14*d*-14*f* if release lever 24 were allowed to move toward release lever 22. Thus, one entire row of plugs may be unlocked from their switch connection with movement of one of the release levers positioned adjacent to such row of plugs to be unlocked. For a quick disengagement of both rows of plugs 14*a*-14*f*, in this example, release levers 22 and 24 would need to be grasped by the user and pushed toward one another.

Locking clips 68 may be constructed of a number of suitable materials that would flex and be durable, such as plastic, a resilient metal such as spring steel or the like. Locking clip 68, in this example, is constructed of a generally U-shaped construction, as seen in FIGS. 9 and 10, with opposing arm members 70 each carrying a finger grip tab 72. Finger grip tabs 72 are positioned on opposing sides of clip 68. A user can grasp locking clip 68 with his or her thumb on one finger grip tab 72 and his or her opposing finger on the other opposing finger grip tab 72. A compression force can be exerted onto finger grip tabs 72 as represented by arrows 74, as shown in FIG. 10, thereby urging compression resistant member 76 together in a direction represented by arrows 78. As compression resistant member 76 compresses, distance designated by x, which represents a distance between two opposing portions of compression resistant member 76 in a relaxed state, is reduced. At the same time, opposing locking tabs 80, positioned on opposing sides of locking clip 68, move from a relaxed position for clip 68 at a spacing distance d to a distance less than distanced.

Figure 14:
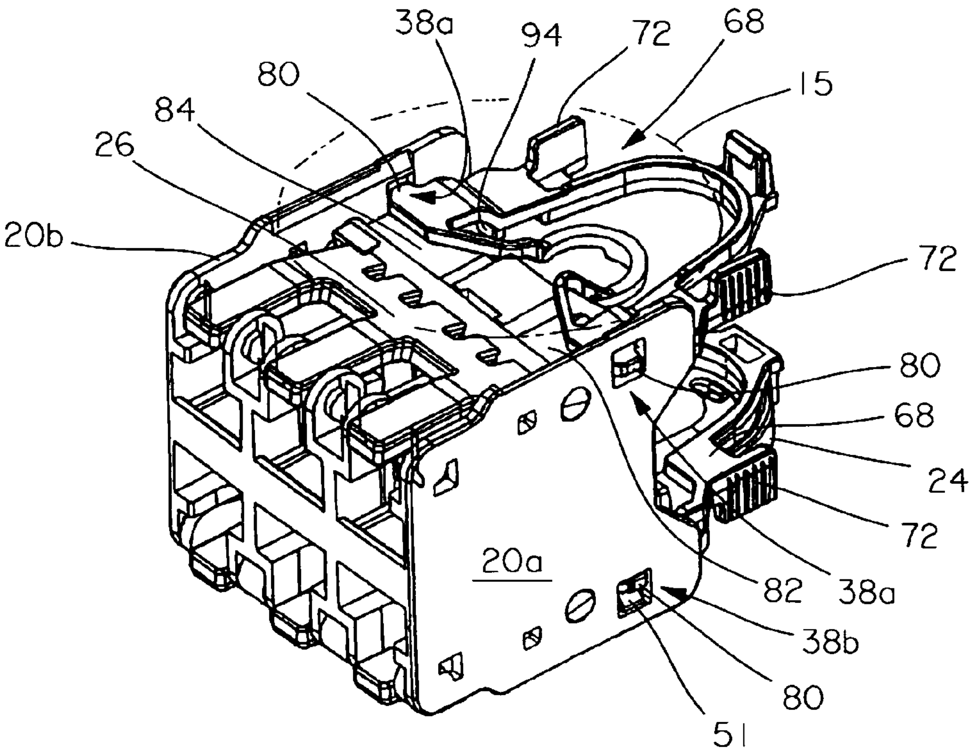
FIG. 14 is a top front perspective view of the cassette assembly of FIG. 12.
Figure 15:
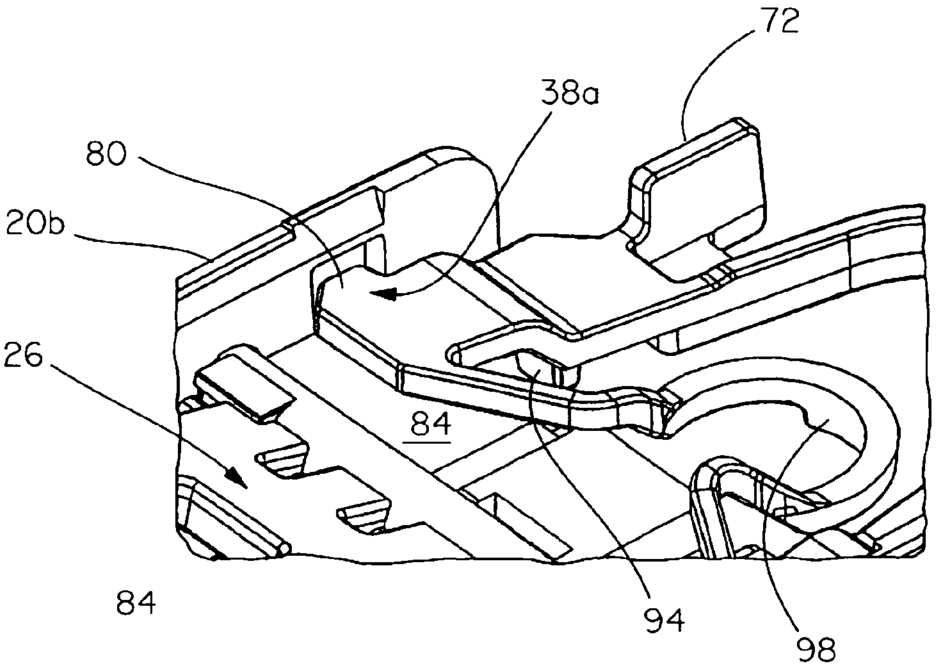
FIG. 15 is an enlarged view of that which is encircled and designated as 15 in FIG. 14.

Thus, with opposing tabs 80 drawn toward one another, clip 68 can be inserted into cassette assembly 10 between opposing sidewalls 20*a* and 20*b*, as seen in FIGS. 14 and 15. With opposing tabs 80 of locking clip 68 positioned in an upper portion of cassette assembly 10 between opposing sidewalls 20*a* and 20*b*, opposing tabs 80 can be positioned to be aligned with sidewall opposing apertures 38*a* of respective sidewalls 20*a* and 20*b*. Similarly, it should be noted that sidewall apertures 38*b* are positioned in opposing sidewalls 20*a*, 20*b* in the lower portion of cassette assembly 10 and receive locking tabs 80 of a locking clip 68 positioned in the lower portion of cassette assembly 10. The configuration for locking clips 68 and their engagement into cassette assembly 10 are the same for engaging the locking clips 68 in the upper or lower portion of cassette assembly 10.

Referring back to the upper portion of cassette assembly 10 with opposing tabs 80 positioned in alignment with sidewall opposing apertures 38*a*, the compression force 74 can be removed and opposing tabs 80 will move back toward a more relaxed position thereby inserting opposing tabs 80 into sidewall opposing apertures 38*a*. Thus, with opposing tabs 80 positioned within opposing apertures 38*a*, locking clip 68 is locked into position within cassette assembly 10. To remove locking clip 68 from the upper portion of cassette assembly 10, opposing finger tabs 72 are urged toward one another until opposing tabs 80 are removed from opposing apertures 38*a*, at which time, locking clip can then be pulled out of cassette assembly 10. The same procedure is followed for installing and removing locking clip 68 from opposing apertures 38*b* in the lower portion of cassette assembly 10.

Figure 11:
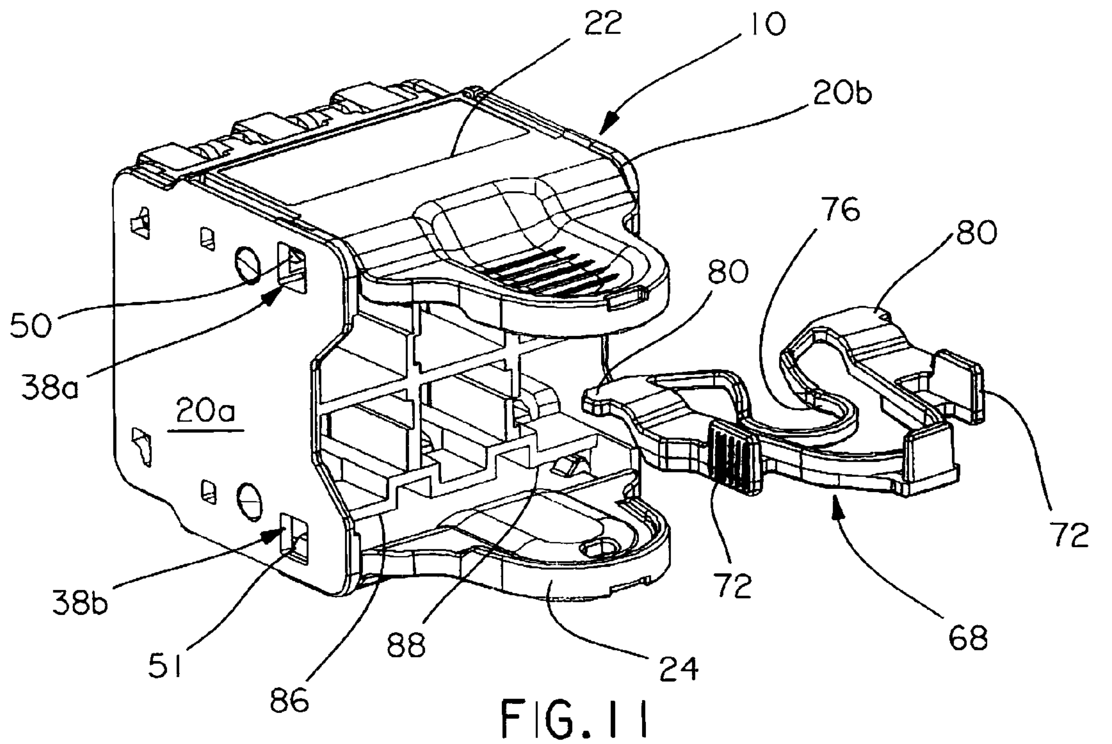
FIG. 11 is an exploded rear perspective view of the cassette assembly and a locking clip.

As seen in FIG. 11, locking clip 68 is positioned to be inserted into cassette assembly 10. It should be understood that in order to prevent upper release lever 22 and lower release lever 24 from being moved in a direction toward the other release lever, a locking clip 68 will need to be positioned adjacent to each of the upper and lower release levers 22, 24. Locking clip 68 is shown positioned adjacent to lower release lever 24 in FIG. 12. Locking clip 68 is positioned adjacent to upper release lever 22 in FIG. 16. With both locking clips 68 in position as set forth in FIGS. 12 and 16, neither release lever 22, 24 is capable of being moved toward the other release lever and all plugs 14*a*-14*f* remain locked into their electrical connections.

As previously discussed, release levers 22 and 24 are rotatably mounted to sidewalls 20*a* and 20*b* and in turn, release levers 22 and 24 are aligned with plug release actuators 26 and 28, respectively. Movement of release levers 22 and 24 toward each other causes plug release actuators 26 and 28 to engage plug latches 64*a*-64*f* of plugs 14*a*-14*f* and move latches 64*a*-64*f* to a release or unlock position to permit simultaneous disengagement of plugs 64*a*-64*f* from their electrical connections.

Figure 12:
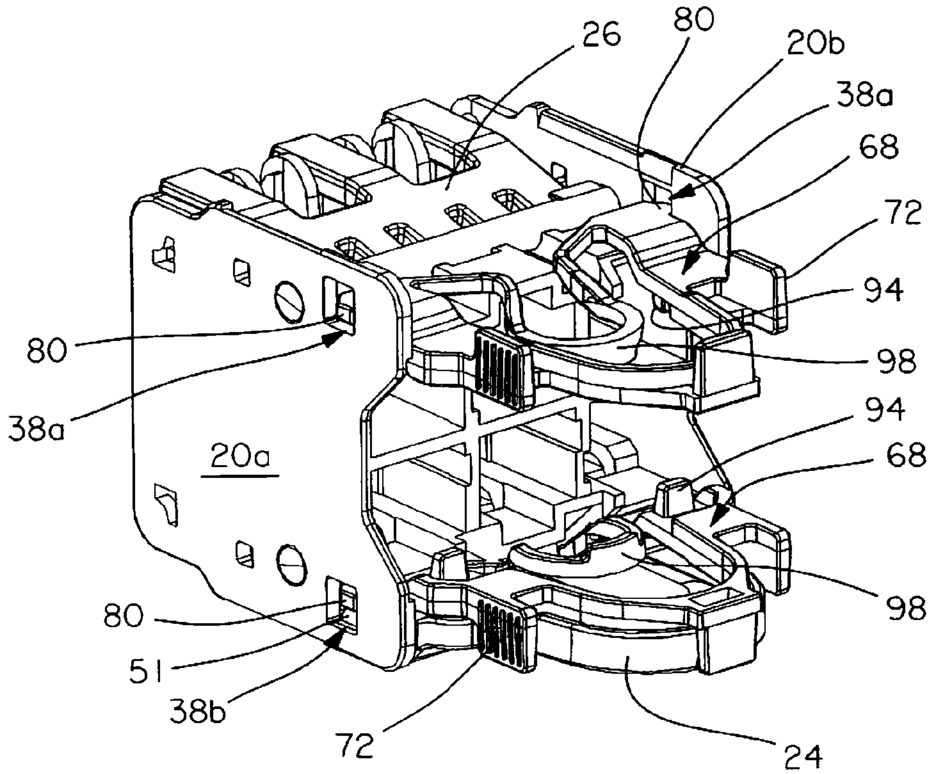
FIG. 12 is a rear perspective view of the cassette assembly of FIG. 11 with a locking clip positioned in an upper portion of the cassette assembly and the upper release lever removed and a locking clip positioned adjacent to lower release lever in the lower portion of the cassette assembly.
Figure 16:
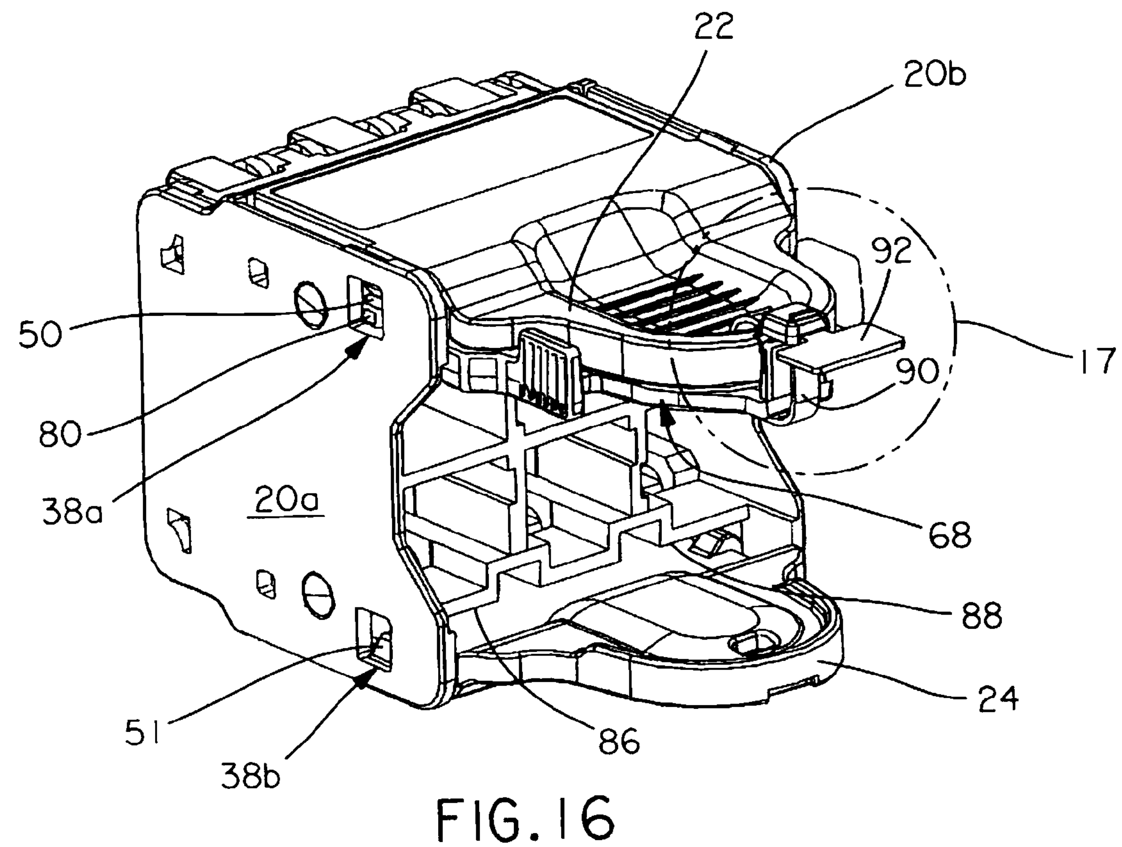
FIG. 16 is a rear perspective view of the cassette assembly with a locking clip positioned adjacent to upper release lever in an upper portion of the cassette assembly and lower release lever positioned in a lower portion of cassette assembly without a locking clip.

With locking clip 68 positioned adjacent to release upper lever 22, as seen in FIG. 16, locking tabs 80 are engaged in opposing sidewall apertures 38*a* (one of the opposing apertures 38*a* is not seen in FIG. 16 but is similarly positioned in sidewall 20*b* as to the one shown in sidewall 20*a*). Locking tabs 80 occupy opposing apertures 38*a* of opposing sidewalls 20*a*, 20*b*, at the same time, tabs 50 which are connected to upper release lever 22 and extend from opposing sides of lever 22 also occupy opposing apertures 38*a*. Tabs 50, in this example, take on a generally triangular shape with the apex of the triangle extending away from lever 22. With tab 50 simultaneously occupying aperture 38*a* with locking tab 80, aperture 38*a* becomes substantially occupied and therefore restricts movement of upper release lever 22. (Aperture 38*a* in sidewall 20*b* in FIG. 16 is not seen but takes on the same configuration as aperture 38*a* in sidewall 20*a*.) As a result, opposing apertures 38*a* are both substantially occupied by tab 50 and locking tab 80. This arrangement is the same for restricting movement of lower release lever 24, as seen in FIGS. 12 and 14. Locking tabs 80 occupy opposing apertures 38*b*, positioned in sidewalls 20*a* and 20*b*, simultaneously with tabs 51 which are connected to lower release lever 24. Thus, with locking clips 68 positioned adjacent to upper and lower release levers 22 and 24, opposing apertures 38*a* and 38*b* are substantially occupied and release levers 22 and 24 are restricted from moving toward the other. As a result, actuators 26 and 28 are prevented from unlocking plugs 14*a*-14*f* from their electrical connection with their respective switches.

Figure 13:
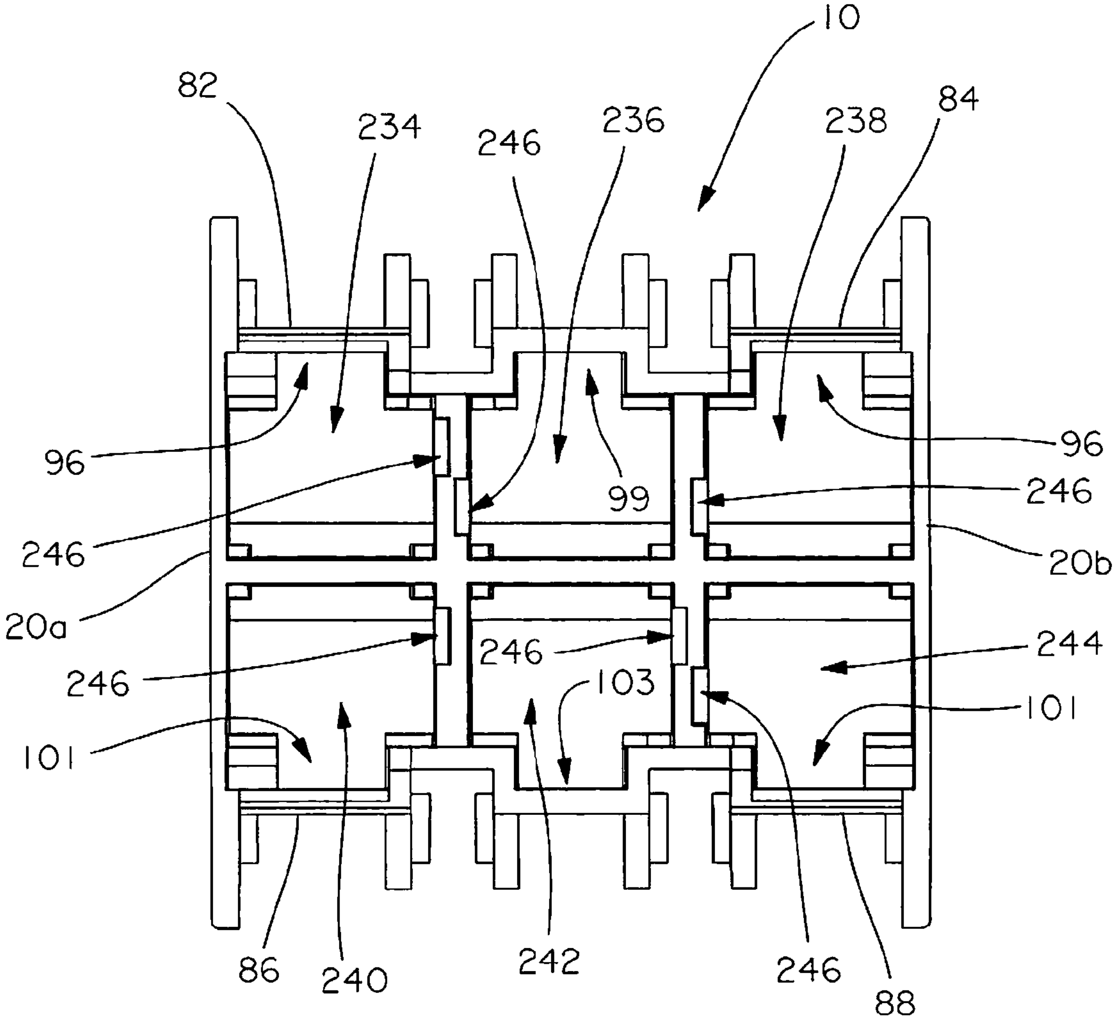
FIG. 13 is a rear plan view of the cassette assembly without upper and lower release levers and without upper and lower plug release actuators.

Locking clips 68, when in position, further restrict movement of release levers 22 and 24 by occupying space between a shelf within cassette assembly 10 which clip 68 abuts and release levers 22 and 24. In this regard FIG. 13 shows shelves 82 and 84 positioned in an upper portion of cassette assembly 10. Similarly, shelves 86 and 88 are positioned in a lower portion of cassette assembly 10. Because the arrangement of the upper release lever 22 and a corresponding locking clip 68 with respect to cassette assembly 10 is the same for lower release lever 24 and a corresponding locking clip 68 with respect to cassette assembly 10, upper release lever 22 will be discussed herein and will apply to the arrangement of lower release lever 24. In referring to FIGS. 14 and 15, it is shown that locking clip 68 rests upon shelves 82 and 84 in the upper portion of cassette assembly 10. With locking clip 68 in this position, it occupies space 89, shown in FIG. 7, which is the space defined between a bottom of upper release lever 22 and shelf 84. A similar space is defined between shelf 82 and upper release lever 22 on the other side of cassette assembly 10. Thus, with locking clip 68 in position occupying such spaces, upper release lever 22 is prevented from moving in a direction toward release lever 24 and thereby prevents plugs 14*a*-14*c* from becoming unlocked with respect to their electrical connection. Again, locking clip 68 occupies a similar space between release lever 24 and shelves 86 and 88 in the lower portion of cassette assembly 10 and prevents plugs 14*d-f* from becoming unlocked as well.

As a result, locking clips 68 restrict movement of release levers 22 and 24 in two fashions. In one fashion locking tabs 80 co-occupy sidewall opposing apertures 38*a* and 38*b* with tabs 50 and 51 which connect with release levers 22 and 24, resulting in apertures 38*a* and 38*b* becoming substantially occupied. In another fashion, locking clips occupy the space defined between release levers 22 and 24 and corresponding shelves 82, 84 and 86, 88, respectively.

Figure 17:
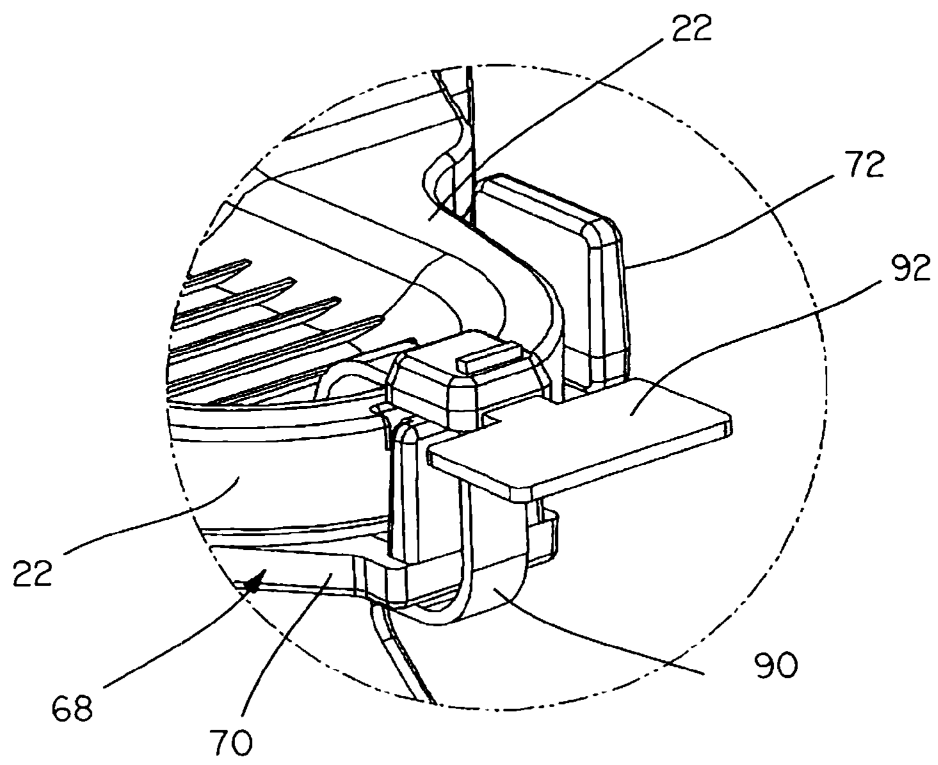
FIG. 17 is an enlarged view of that which is encircled and designated as 17 in FIG. 16.

In referring to FIGS. 16 and 17, locking clips 68 can be further secured in locking position. Locking clip 68, in locking position with respect to upper release lever 22, is secured to upper release lever 22 by use of cable tie 90. Cable tie 90 passes through an opening (not shown) in upper release lever 22 and passes around locking clip 68 and around the remainder of upper release lever 22. Cable tie 90 can be of a wide variety of locking or releasably locking constructions. In this embodiment a locking cable tie is used, thus to remove it, it must be cut. Additionally, in this example, label 92 is provided as a portion of cable tie 90 and can be used for designating electrical connection information. A cable tie can likewise be employed to further secure locking clips 68 to lower release lever 24.

It should be understood that in this example, locking clips 68 are all generally constructed of the same size and shape and can be used for either locking an upper release lever 22 or a lower release lever 24.

An additional feature of locking clip 68 includes tabs 94, as seen in FIGS. 12, 14 and 15. Tab 94 in FIGS. 12, 14 and 15 extends from opposing sides of locking clip 68. With locking clip 68 in locking position with respect to upper release lever 22, as seen in FIG. 16, tabs 94 are positioned to block access to openings 96 within cassette assembly 10, seen in FIG. 13. With tabs 94 positioned in front of openings 96, access to plug latches 64*a* and 64*c* of plugs 14*a* and 14*c* are blocked thereby preventing someone from accessing such latches and individually unlocking plugs 14*a* and 14*c* from their electrical connection with upper release lever 22 in a locked position with locking clip 68. Tab 98 is provided in the example seen in FIG. 15. Tab 98 extends in the same direction as tabs 94 and blocks access to opening 99 as seen in FIG. 13. Tab 98 serves the same purpose as tabs 94, in that, tab 98 inhibits access to plug latch 64*b* of plug 14*b* preventing individually unlocking plug 14*b* with respect to its electrical connection with locking clip 68 in position. The same arrangement of tabs 94 and 98 will block openings 101 and 103 positioned in a lower portion of cassette assembly 10, shown in FIG. 13. Thus, with locking clip 68 in position with relationship to lower release lever 24, tabs 94 and 98 block access to plug latches 64*d-f* of plugs 14*d-f*.

Figure 18:
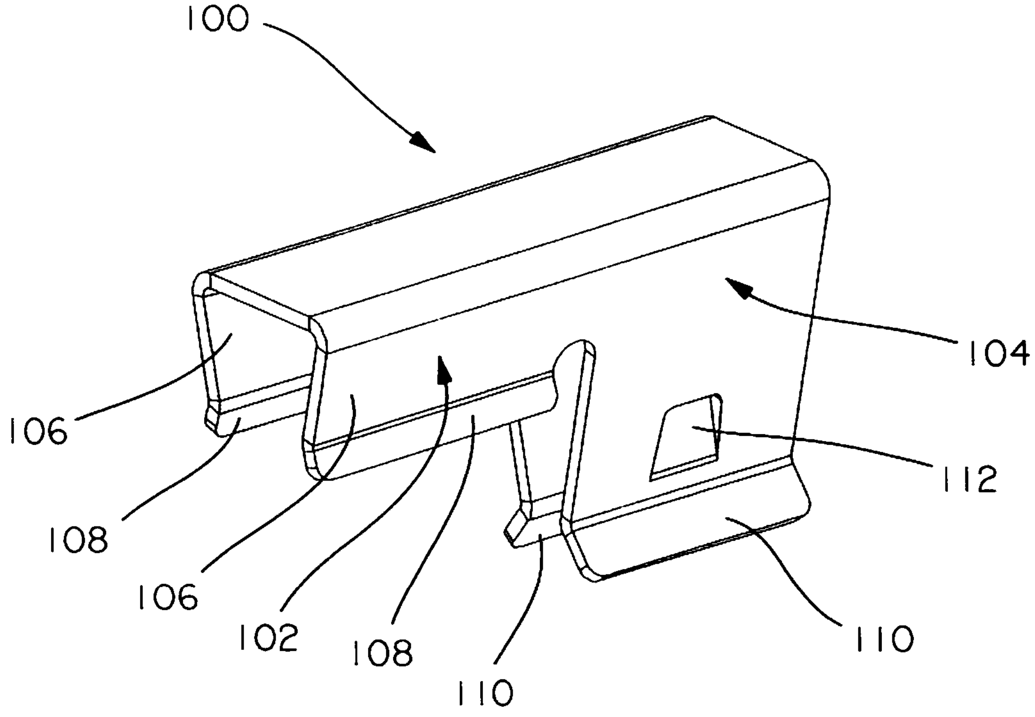
FIG. 18 is a perspective view of the bridge clip of the present invention.
Figure 19:
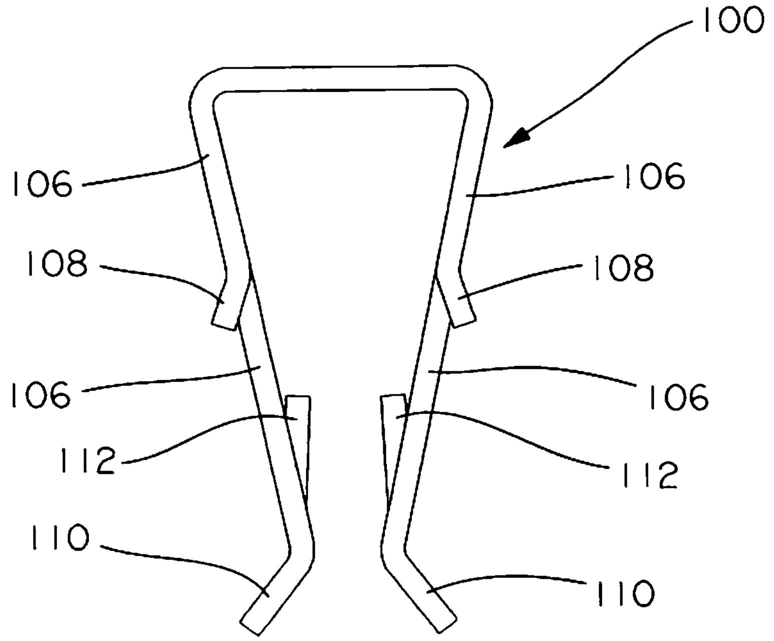
FIG. 19 is a front elevation view of the bridge clip of FIG. 18.
Figure 22:
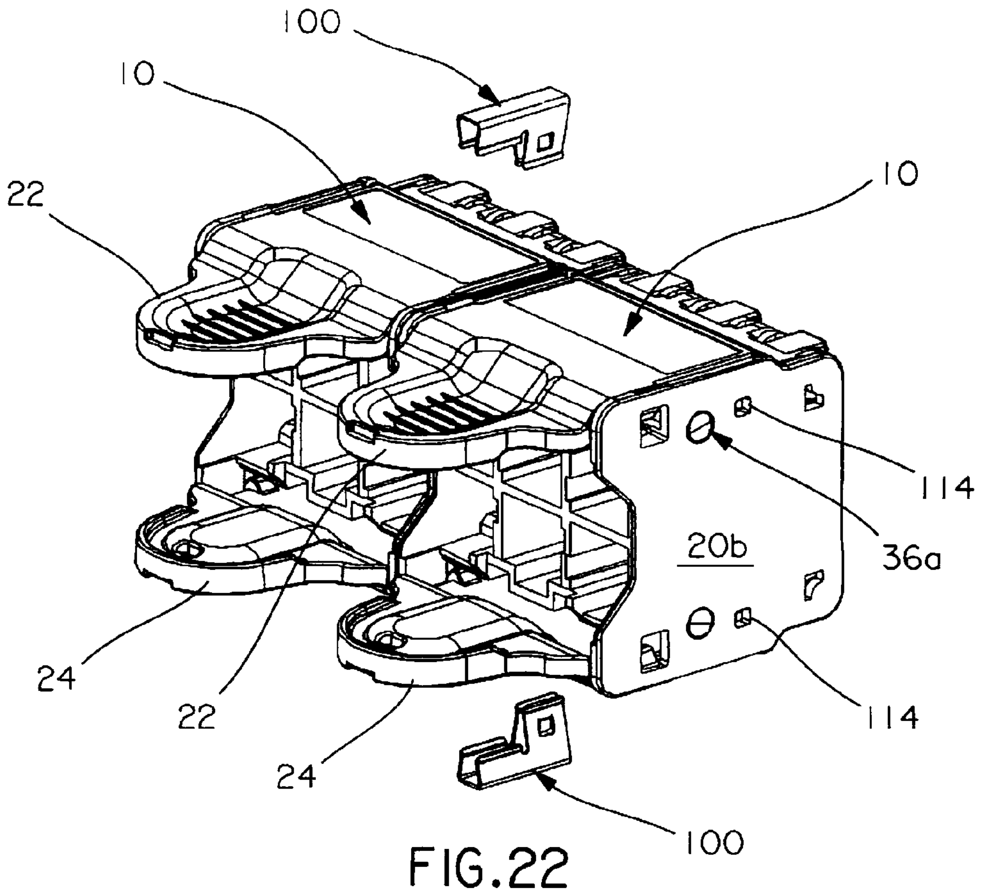
FIG. 22 is an exploded rear perspective view of two cassette assemblies of the present invention which are positioned side by side and a bridge clip is positioned to connect the top portion and another bridge clip is positioned to connect the bottom portion of the two cassette assemblies.
Figure 23:
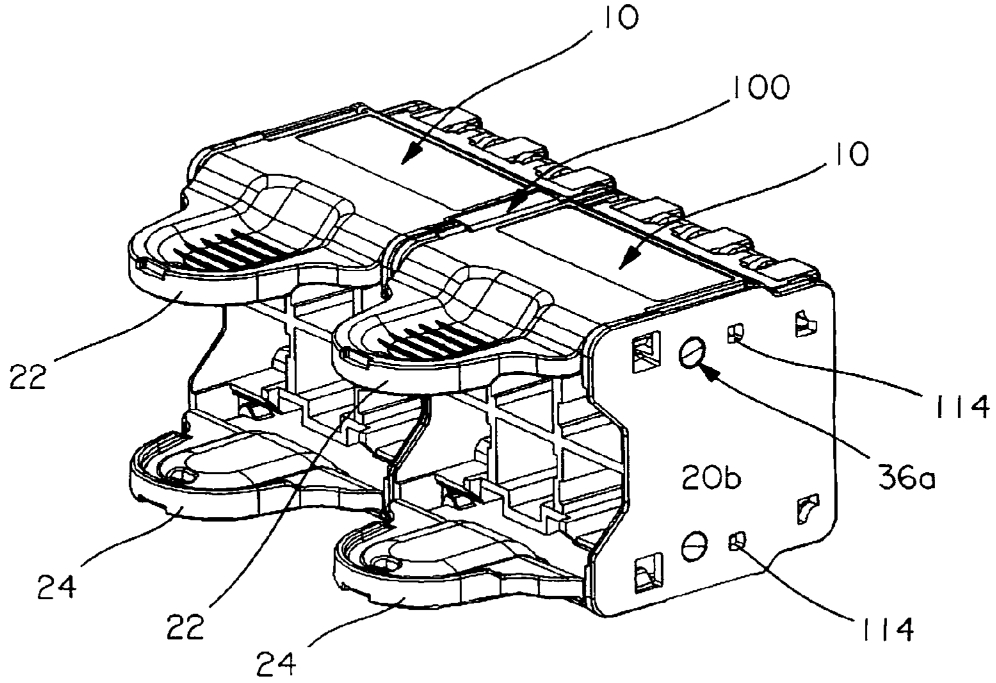
FIG. 23 is the rear perspective view of the two cassette assemblies of FIG. 22.

A further feature of this invention includes a bridge clip 100, as shown in FIGS. 18 and 19. Clip 100 is constructed of a spring steel material or the like and is used to align and secure two cassette assemblies 10 together in a side by side arrangement as seen in FIGS. 22 and 23. Typically, each cassette assembly 10 contains 6 or 8 positions for holding electrical connection plugs, thus with securing two cassettes 10 together side by side, one can provide for 12 to 16 plug connections which can be quickly released. This combining or ganging of cassette assemblies 10 provides for convenient and efficient electrical connections for conventional patch panels.

Figure 21:
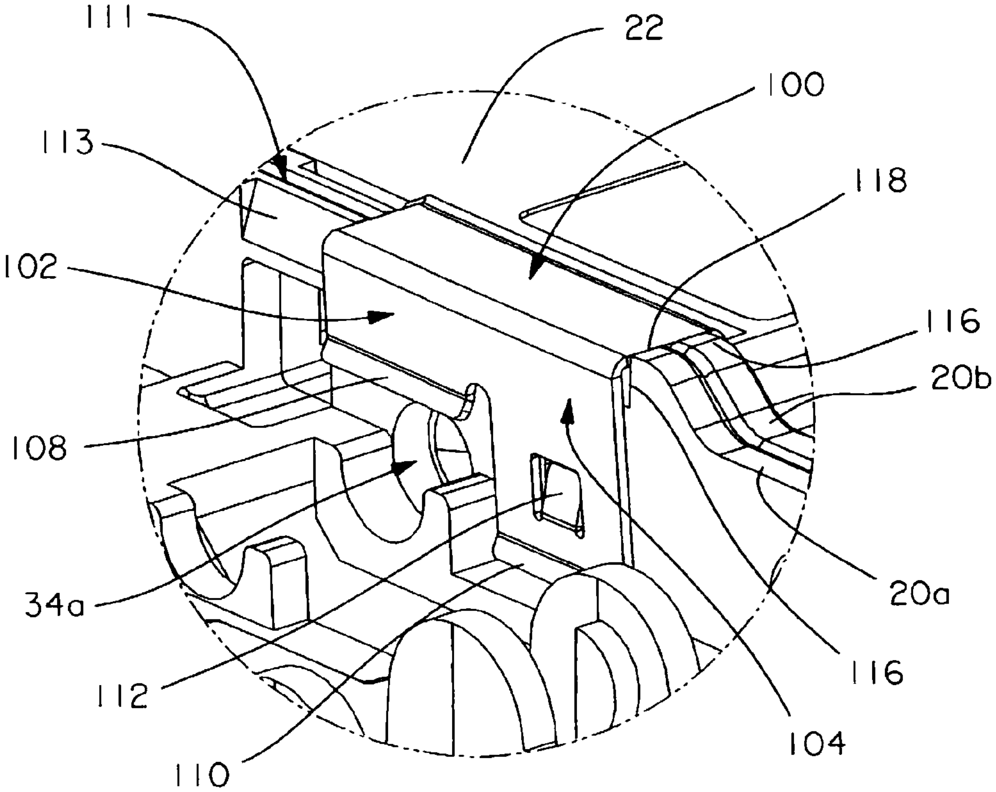
FIG. 21 is an enlarged view of that which is encircled and designated as 21 in FIG. 20.

In the example shown, bridge clip 100 forms a generally L shaped configuration. The L shaped configuration comprises a narrower body portion 102 and a wider body portion 104 which are constructed of opposing converging or beveled sidewalls 106. Each of the narrower body portion 102 and the wider body portion 104 have lower portions 108 and 110 respectively that flair outwardly from converging opposing sidewalls 106. As will be discussed herein, flair portions 108 and 110 will facilitate bridge clip 100 engaging sidewalls 20*a* and 20*b* of two adjacent cassette assemblies 10 and permit clip 100 to be slid over the top portion 111 of adjacent sidewalls 20*a* and 20*b*, as seen in FIG. 21.

The converging configuration of sidewalls 106 of clip 100 provides a gripping force with sidewalls 106 pulled apart from its relaxed position. In order for adjacent sidewalls 20*a* and 20*b* of two adjacent cassette assemblies 10 to be positioned within the converging sidewalls 106 of clip 100, sidewalls 106 need to be pulled slightly apart. With sidewalls 106 pulled slightly apart, opposing sidewalls 106 exert a confining force onto sidewalls 20*a* and 20*b*. To facilitate separating or pulling apart sidewalls 106 of clip 100, top edge 111 of each of the sidewalls 20*a* and 20*b* each define a beveled portion 113 (the beveled edge 113 of sidewall 20*b* is not shown but has the same configuration as that shown on sidewall 20*a* in FIG. 21.) Beveled edges 113 provide a narrower overall width of sidewalls 20*a* and 20*b* near the top edge 111. Flair portions 108 and 110 of clip 100 engage beveled edges 113 of each of sidewalls 20*a* and 20*b*. As force is applied to bridge clip 100 to urge clip 100 onto sidewalls 20*a* and 20*b*, flared portions 108 and 110 slide along beveled edges 113 and the width of the combined sidewalls 20*a* and 20*b* increases. As a result, sidewalls 106 of clip 100 thereby spread or pull apart. Beveled edges 113 and the flared portions 108 and 110 provide a smooth spreading apart of sidewalls 106 thereby permitting clip 100 to exert a gripping force upon sidewalls 20*a* and 20*b*.

In addition to the gripping force exerted on sidewalls 20*a* and 20*b*, in this example, bridge clip 100 locks onto adjacent sidewalls 20*a* and 20*b*. When locking tabs 112, as seen in FIGS. 18 and 19, are aligned with openings 114 in adjacent sidewalls 20*a* and 20*b* of adjacent cassette assemblies 10, tabs 112 extend into openings 114. With tabs 112 extending into openings 114, bridge clip 100 resists removal from its engagement of securing two adjacent cassette assemblies 10 because tabs 112 are oriented to engage an interior perimeter of openings 114 should a removing or lifting force be applied to clip 100.

With two cassette assemblies 10 positioned in a side by side relationship to one another, as shown in FIGS. 22 and 23, two clips 100, in this example, are engaged to sidewalls 20*a* and 20*b* of the adjacent cassette assemblies 10. One clip 100 is positioned on a top side of cassette assemblies 10 and another clip 100 is positioned on a bottom side of cassette assemblies 10. The use of two clips 100 to secure cassette assemblies 10 together provides a reliable securement.

Figure 20:
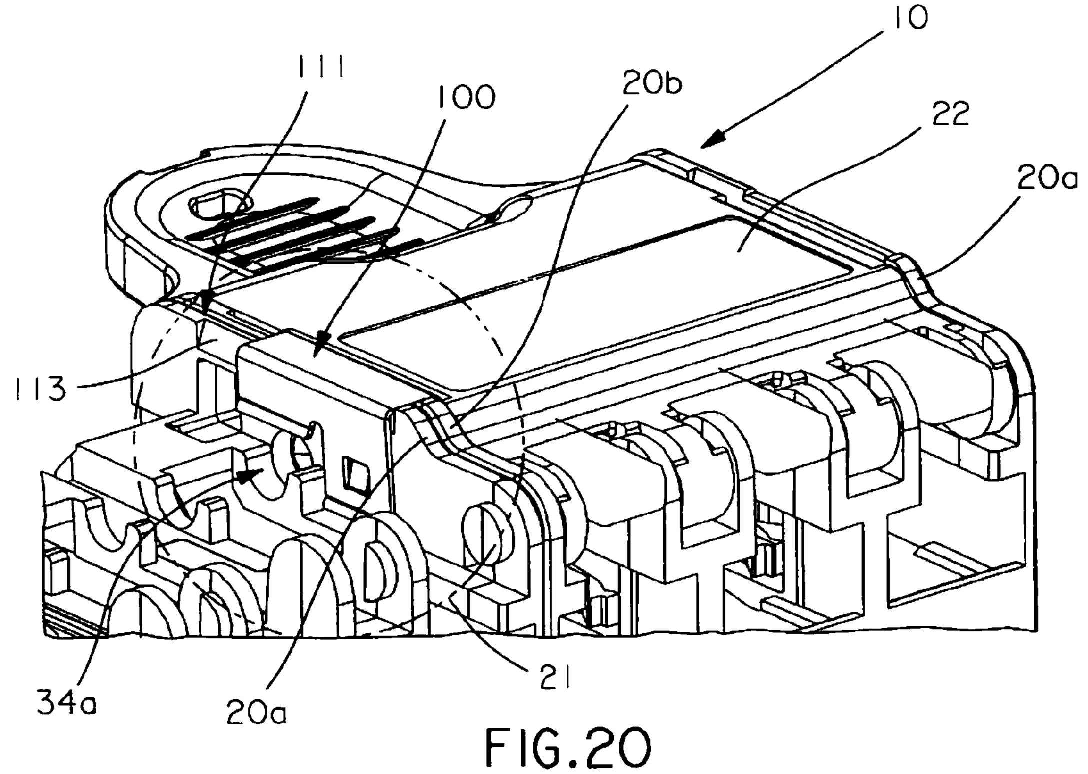
FIG. 20 is an enlarged partially cut away front perspective view of a cassette assembly positioned adjacent to another cassette assembly without an upper release lever and without upper plug release actuator on the other cassette assembly.

In referring to FIGS. 20 and 21, circular aperture 34*a* is positioned in sidewall 20*a* of cassette assembly 10. Aperture 34*a*, as described above, supports cylindrical bar 46 of plug release actuator 26 which is associated with upper release lever 22. The same configuration is provided in the lower portion of cassette assembly 10 that is associated with lower release lever 24, however, for convenience, only circular aperture 34*a* will be described which is associated with upper release lever 22. Bridge clip 100 provides a narrower body portion 102 so as not to block the engagement of circular bar 46 of plug release actuator 26 with circular aperture 34*a* on sidewall 20*a* for one cassette assembly 10 and on sidewall 20*b* for the adjacent sidewall of other adjacent cassette assembly 10.

Wider body portion 104 provides assistance in aligning the fronts and backs of the two side by side cassette assemblies 10. Beveled edges 113 on top portion 111 of adjacent sidewalls 20*a* and 20*b* of the two side by side cassette assemblies 10 are of the same length and are similarly positioned on both cassette assemblies 10 in relationship to the front and back of each cassette assembly 10. End walls 116 are positioned at the end of each beveled edge 113 of each of the cassette assemblies 10 wherein end walls 116 are positioned approximately the same distance from the front and back of both cassette assemblies 10. Thus, when a user is securing two cassette assemblies 10 together with bridge clip 100, the user merely has to slide bridge clip 100 over sidewalls 20*a* and 20*b* and position end 118 of bridge clip 100 to abut end walls 116 of both sidewalls 20*a* and 20*b* of adjacent cassette assemblies 10. Thus, with end walls 116 of each adjacent cassette assembly 10 aligned with one another, the front and back sides of the two cassette assemblies 10 are aligned with each other.

Figure 24:
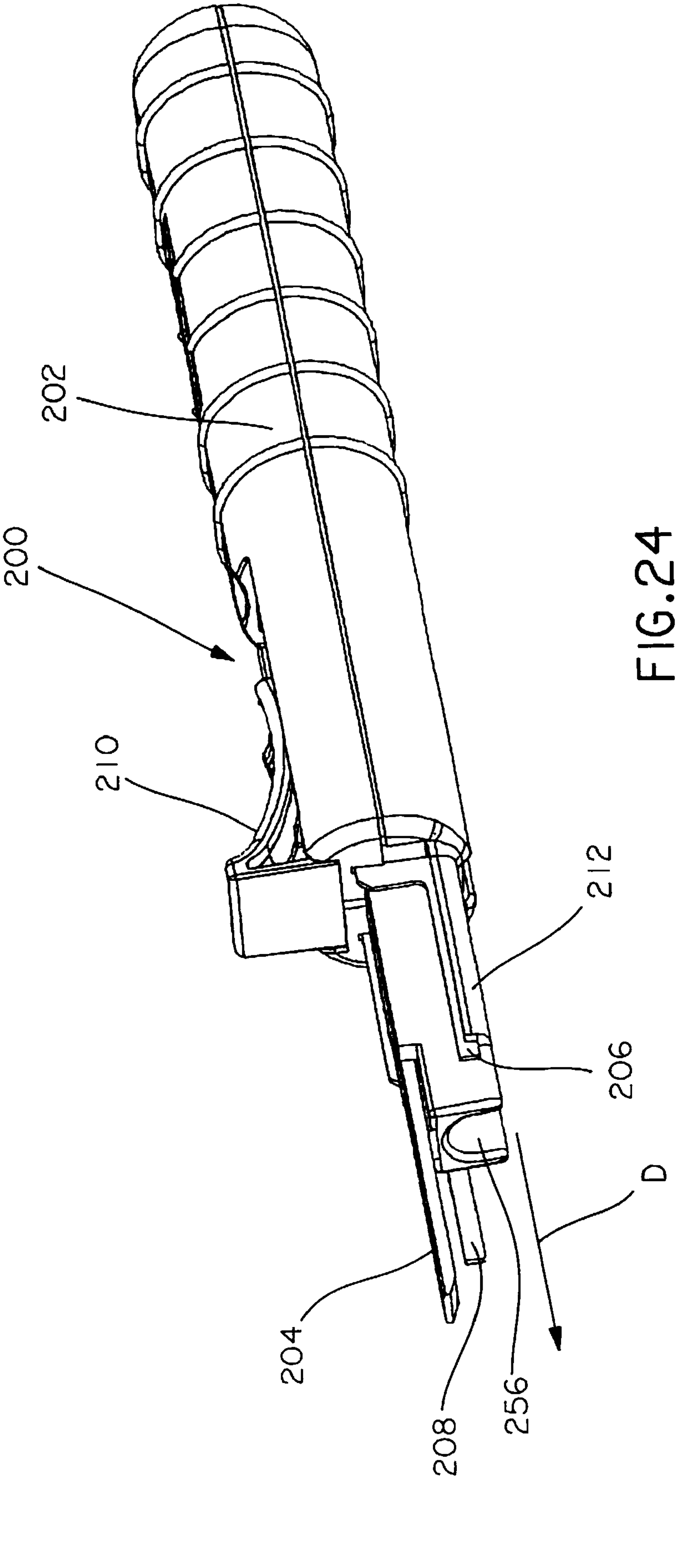
FIG. 24 is a side perspective view of the plug unlocking tool with actuator 210 in a forward position, latch release finger 208 in an extended position and latch release finger 206 in a blocked position (latch release finger 206 would be typically blocked by a rear wall of plug cassette assembly 10 not shown in this drawing)

Referring to FIG. 24, plug unlocking tool 200 is shown. Plug unlocking tool 200, as will be described herein, will unlock a plug, such as, for example, a plug which is attached to a patch cord, from an electrical connection with the plug residing in a plug cassette assembly 10. In addition, plug unlocking tool 200 will unlock the plug from a locked position within plug cassette assembly 10. The unlocking and removal of the plug from the electrical connection and plug cassette assembly 10 is accomplished with the use of one hand of the user employing plug unlocking tool 200.

Plug unlocking tool 200 includes housing 202, probe 204, a first and second latch release fingers 206 and 208 and an actuator 210 capable of imparting movement to at least one of the latch release fingers 206, 208. In this view, it should be noted that actuator 210 is moved to a forward position. With actuator 210 in the forward position and where finger 208 is unblocked and finger 206 is blocked, typically by a rear wall of cassette assembly 10 (not shown), latch release finger 208 will be positioned in an extended position, as shown, and finger 206 will be positioned in a non-extended position, as shown.

Probe 204 is secured to housing 202 and, in this example, is secured in a fixed stationary position relative to housing 202. In this example, probe 204, like housing 202, are both elongated in shape, wherein probe 204 extends in a direction D away from housing 202, a direction which coincides with a direction in which a length of housing 202 extends. Likewise, latch release fingers 206 and 208 extend away from housing 202 in direction D similar to probe 204. Housing 202 is sized and shaped to be easily grasped by one hand of the user and actuator 210 is positioned to be readily accessible by the thumb of the user.

Figure 25:
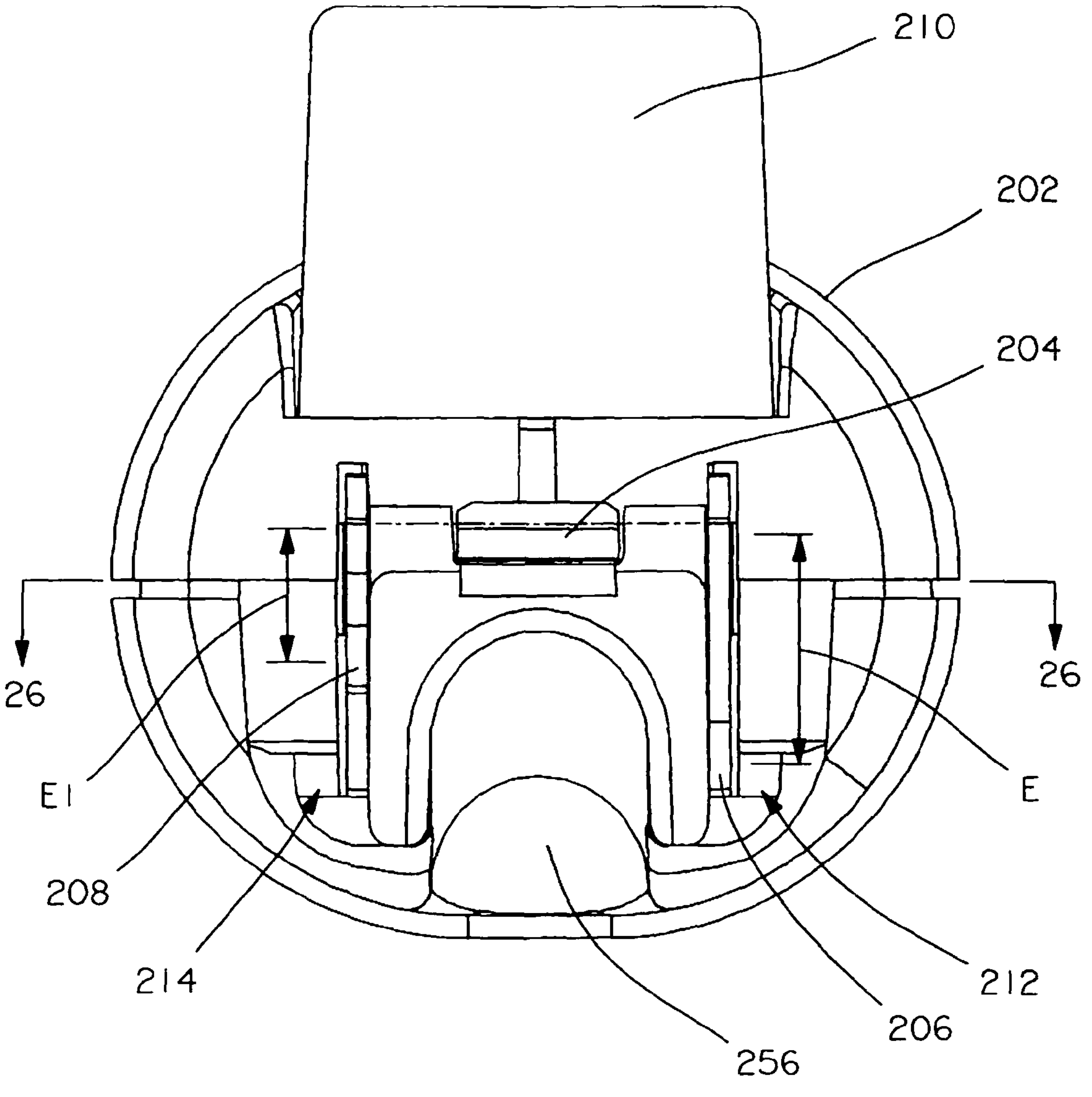
FIG. 25 is a front end view of the plug unlocking tool of FIG. 24.

In referring to FIG. 25, a view of the front end of tool 200 is shown. As will be appreciated herein, the spacing and positioning of probe 204 and first and second latch release fingers 206 and 208 are important for utilizing tool 200 effectively with plug cassette assembly 10. Fingers 206 and 208 are spaced apart from one another a predetermined distance and are each spaced apart from probe 204 a predetermined distance. Additionally, it should be noted that fingers 206 and 208 are also positioned at different elevations E and E1 respectively with respect to probe 204. These predetermined distances and relative elevations will coincide with distances and positions of slots positioned within cassette assembly 10. Such coincidental spacings will permit probe 204 and one of first and second latch release fingers 206 and 208 to penetrate desired slots and unlock a plug positioned within cassette assembly 10 from electrical connection and from the cassette. This above described orientation and spacings of the fingers 206 and 208 and probe 204 and how they are employed to unlock a plug from cassette 10, will be discussed in more detail below.

In order to appropriately access slots within cassette assembly 10 to perform the unlocking of the plug, probe 204 is dimensioned so as to fit within such slots defined in plug cassette assembly 10. In the example shown herein, probe 10 will penetrate a slot which is aligned with a latch of a tangle free plug and depress the latch thereby unlocking the plug from its electrical connection. Similarly, fingers 206 and 208 are dimensioned so as to be able to fit within another slot defined in plug cassette assembly 10 in order for one of the fingers 206 and 208 to engage a housing or locking clip and unlock the plug from plug cassette assembly 10. The unlocking of the plug from the electrical connection and from plug cassette assembly 10 will be discussed in more detail below.

As seen in FIGS. 24 and 25, first and second latch release fingers 206 and 208 each reside in first and second slots 212 and 214 respectively. First and second slots 212 and 214 are secured to housing 202 and each are positioned to extend along a length of housing 202. Fingers 206 and 208 each can move or slide within slots 212 and 214 respectively and are thereby each moveable relative to housing 202. As mentioned above, fingers 206 and 208 are spaced apart as are slots 212 and 214 which carry fingers 206 and 208.

Figure 26:
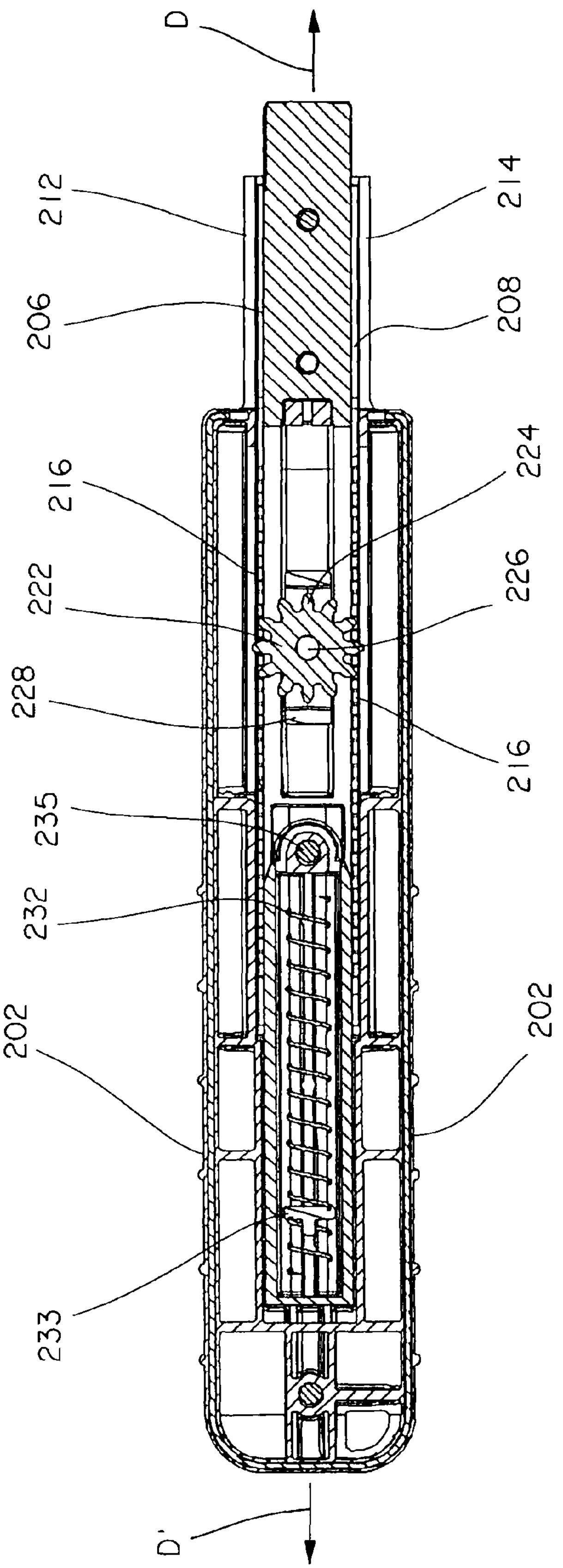
FIG. 26 is a cross section view taken along line 26-26 of FIG. 25.
Figure 27:
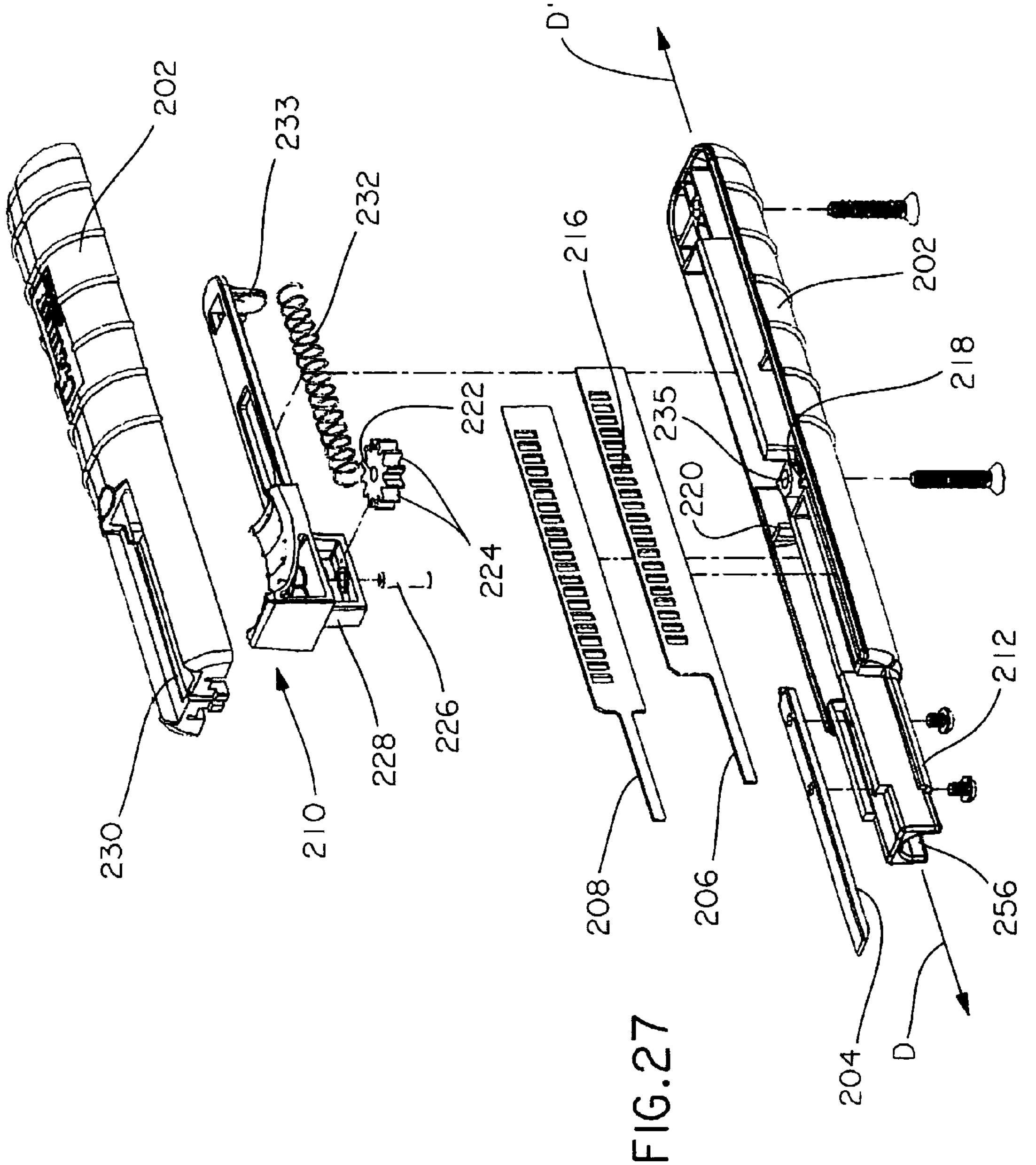
FIG. 27 is an exploded view of the parts of the plug unlocking tool of FIG. 24.
Figure 28:
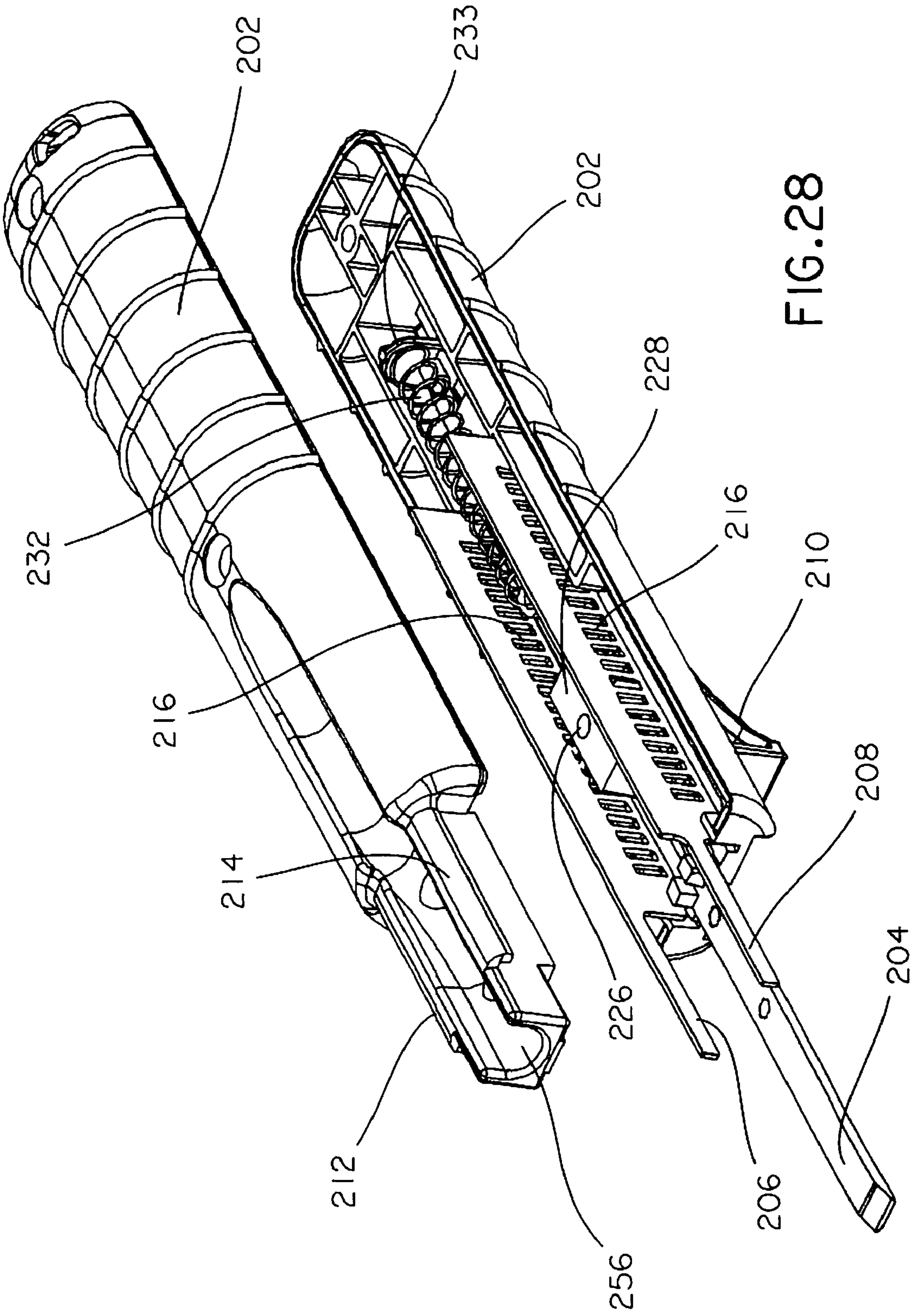
FIG. 28 is a bottom perspective view of the plug unlocking tool with a bottom portion of the housing separated from a top portion of the housing.

An example of the structure that imparts movement to one or both of first and second latch release fingers 206 and 208 of plug unlocking tool 200, is shown in FIGS. 26-28. Row of slots 216 are defined in a portion of each of spaced apart first and second fingers 206 and 208. Aligned with slots 212 and 214 are first and second walls 218 and 220 respectively. Each of first and second walls are secured to housing 202, as seen in FIG. 27. First wall 218 is positioned to limit and block first finger 206 moving or sliding within slot 212 in a path of movement in an opposite direction of the arrow designated as D, which is the direction of the arrow designated as D', as seen in FIG. 27. Similarly, second wall 220 is positioned to limit and block finger 208 moving or sliding in a path of movement in an opposite direction of the arrow designated as D, which, again, is the direction of the arrow designated as D'. Thus, first and second walls 218 and 220 will limit the travel of fingers 206 and 208 respectively in a direction toward the rear of tool 200.

As seen in FIGS. 26-28, portions of fingers 206 and 208 are spaced apart within housing 202 such that rows of slots 216 of each portion are spaced apart on opposing sides of housing 202. Gear 222, which comprises a plurality of teeth 224 extending radially from the main body of gear 222, is positioned between portions of fingers 206 and 208 such that teeth 224 on opposing sides of gear 222 engage a slot in row of slots 216 in each of portions of fingers 206 and 208. Gear 222 is rotatably mounted to axle 226. Opposing ends of axle 226 are, in turn, mounted onto bracket 228, as seen in FIG. 27, of actuator 210, such that gear 222 is able to rotate relative to actuator 210. Actuator 210, in this example, is positioned partially outside of housing 202 wherein it is accessible by the thumb of a user. Another portion of actuator 210 is positioned inside of housing 202. Slot 230 is defined by housing 202 wherein a portion of actuator 210 extends there through thereby permitting actuator 210 to slide along slot 230 and thus be moveable relative to housing 202. In this example, the resting position of actuator 210 is the most rearward position of slot 230, in the direction D'.

Actuator 210 is resiliently mounted relative to housing 202 wherein spring 232 is positioned between tab 233 of actuator 210 and boss 235 secured to an inside portion of housing 202. With actuator 210 in its rearmost or resting position within slot 230, spring 232 is in a relative extended position. With actuator moved in direction D or in a forward direction, spring 232 is placed into a compressed position. Thus, as actuator 210 is moved in direction D along slot 230, spring 232 becomes compressed such that when a user releases actuator 210, spring 232 will extend outwardly from a compressed condition and move actuator 210 rearwardly or in direction D' toward a rear position in slot 230.

Figure 29:
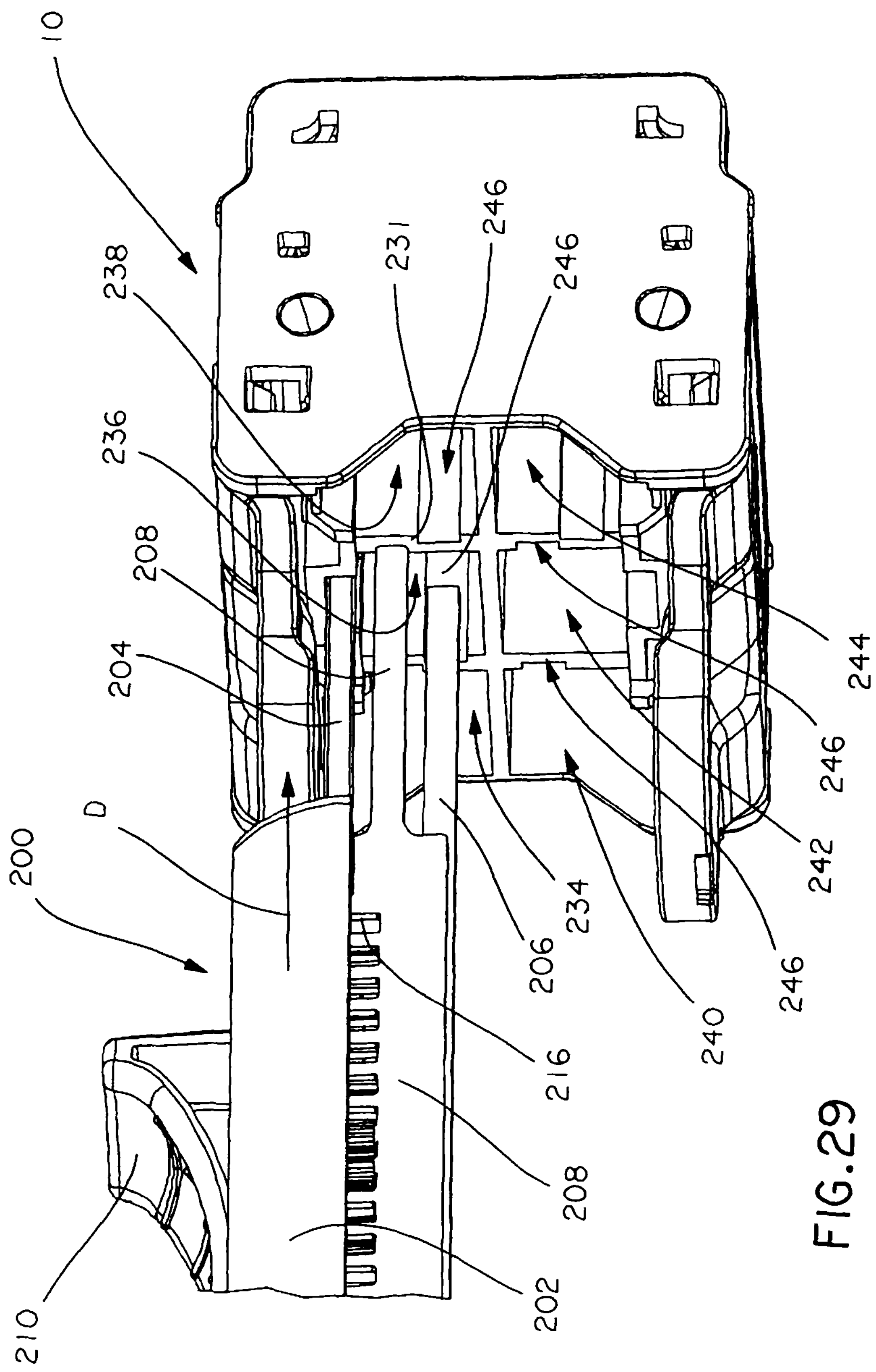
FIG. 29 is an enlarged perspective view of the plug unlocking tool (with a lower portion of the housing removed) being engaged to the plug cassette assembly.
Figure 30:
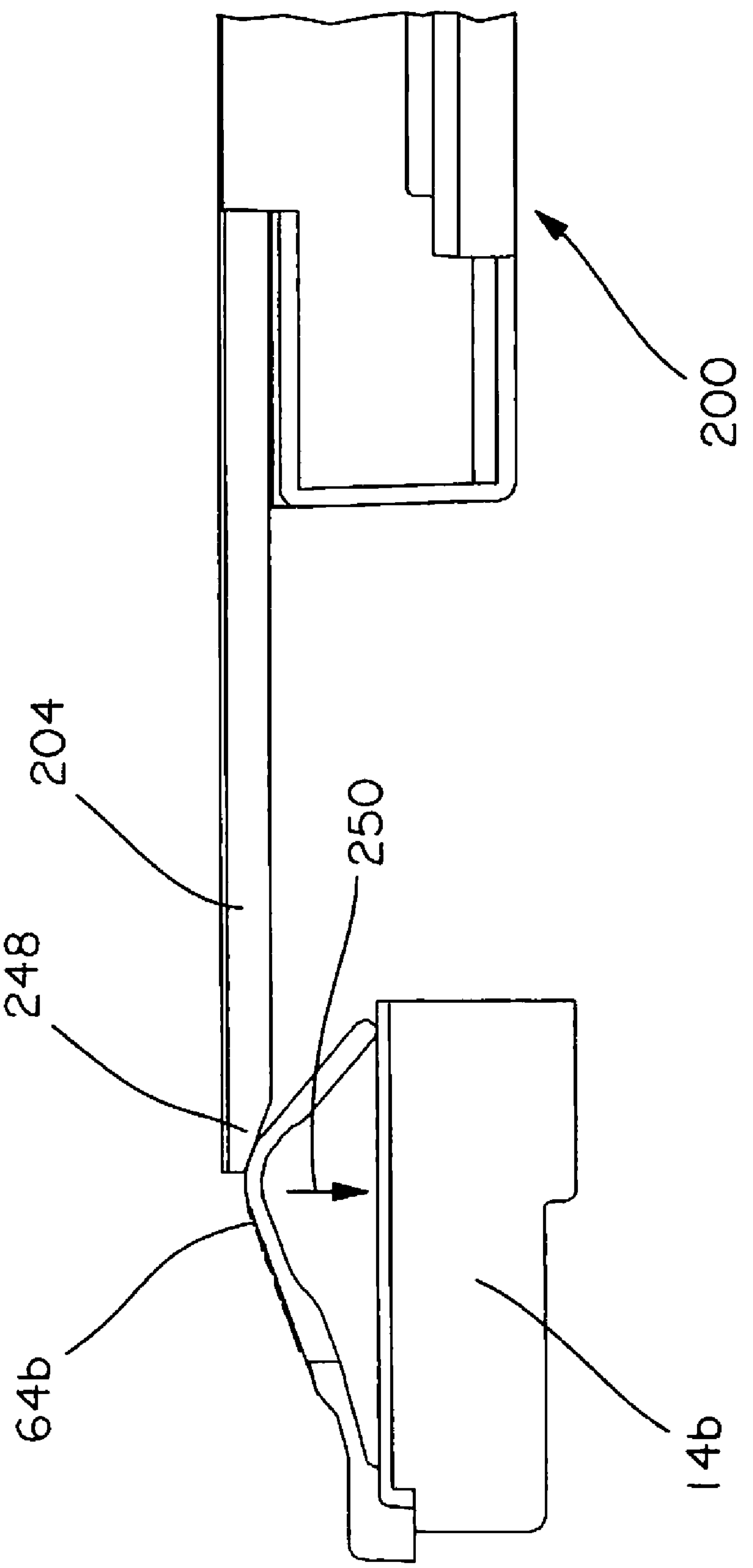
FIG. 30 is a partial enlarged view of a front end of a probe engaging a latch of a plug.

Generally referring to FIGS. 26-28, with actuator 210 in its rearward position within slot 230, opposing teeth 224 of gear 222 are engaged in slots positioned in portions of fingers 206 and 208. A force can be applied by the users thumb onto actuator 210 in direction D. With opposing teeth 224 positioned in slots of fingers 206 and 208, both fingers 206 and 208 will move simultaneously forward in direction D. However, with one of the two fingers 206 and 208 blocked by a rear wall 231 of plug cassette assembly 10, as seen in FIG. 29, (wherein finger 208 is blocked) and the thumb of the user continues to move actuator 210 forward in direction D, gear 222 will begin to rotate in a clockwise direction and teeth 224 of gear 222 will engage the slots in finger 208 and will move finger 208 rearward toward second wall 220, seen in FIGS. 26 and 27. Finger 208 will move backward or in direction D' until the force applied by the user's thumb is stopped or until finger 208 is blocked by abutting second wall 220. With forward movement in direction D of actuator 210, teeth 224 of gear 222 which engage slots in finger 206, move finger 206 in a forward direction D. It should be understood that if finger 206 is blocked by rear wall 231 and a forward force is applied to actuator 210, gear 222 rotates counter clockwise. Finger 206 will be moved backward in direction D' and can be blocked by abutting first wall 218 and finger 208 will be moved forward in direction D by teeth 224 of rotating gear.

In this example, probe 204 extends forward in direction D and is stationary relative to housing 202. On the other hand, as will be understood below, with one of fingers 206 and 208 blocked and a forward force applied in direction D to actuator 210, the blocked finger will be moved in a rearward direction, direction D', and the unblocked finger will be moved forward in direction D.

Now referring to FIGS. 29-32, the utilization of plug unlocking tool 200 can be seen. The employment of plug unlocking tool 200 can be seen in FIG. 29 (This view is without cords attached to the plugs contained within cassette 10 that would extend out of the rear portion of cassette assembly 10 and somewhat inhibit the view of tool 200 in operation), Cassette assembly 10 defines six openings 234, 236, 238, 240, 242 and 244. as seen in FIGS. 13 and 29. Each of these openings are capable of holding one plug. As previously discussed, plugs **14*a*-14*f* reside in these openings. As seen in FIG. 13, these openings are aligned in two rows of three each. In referring to FIG. 29, plug unlocking tool 200 is positioned to remove a plug positioned in opening 236 which is the top center opening in cassette assembly 10. The description of the removal of plug 14*b* from opening 236 is merely an example of how to similarly remove the other plugs that may reside in cassette assembly 10** in the other openings.

As can be seen in FIGS. 13 and 29, slots 246 are defined in a sidewall of each of the six openings. Openings or slots 96, 99, 101 and 103, as seen in FIG. 13 are positioned adjacent to openings 234-244. As will be discussed herein, slots 246 align with tabs of housing or locking clips 30, 32, as discussed above. Similarly, openings or slots 96, 99, 101 and 103 are aligned with plug latches **64*a*-64*f*. As can be appreciated in viewing FIG. 13, the positioning of slot 246 for a particular opening and relative to opening or slots 96, 99, 101 and 103 dictate the orientation and spacings of probe 204 and latch release fingers 206 and 208. As can be further appreciated, the user of tool 200 will orient probe 204 and fingers 206 and 208 accordingly to allow probe 204 and one of fingers 206 and 208** to enter its appropriate slot to unlock a desired plug.

For purposes of demonstrating the use of tool 200, a user will unlock and remove plug **14*b* positioned in opening 236 of cassette assembly 10. The user aligns probe 204 with opening 99 and aligns finger 206 with slot 246. The user will move tool 200 toward cassette 10 such that probe 204 penetrates opening 99 and actuates actuator 210 with the user's thumb to commence forward movement of actuator 210 within slot 230 of housing 202**.

Latch **64*b* is positioned aligned with opening 99. Probe 204 penetrates into opening or slot 99 and engages plug latch 64*b*, as demonstrated in FIG. 30. Beveled front edge 248** of probe 204 engages latch 64*b* and causes latch 64*b* to move in a downward direction indicated by arrow 250. With latch 64*b* moved in a downward position plug 14*b* is unlocked from its electrical connection.

Figure 31:
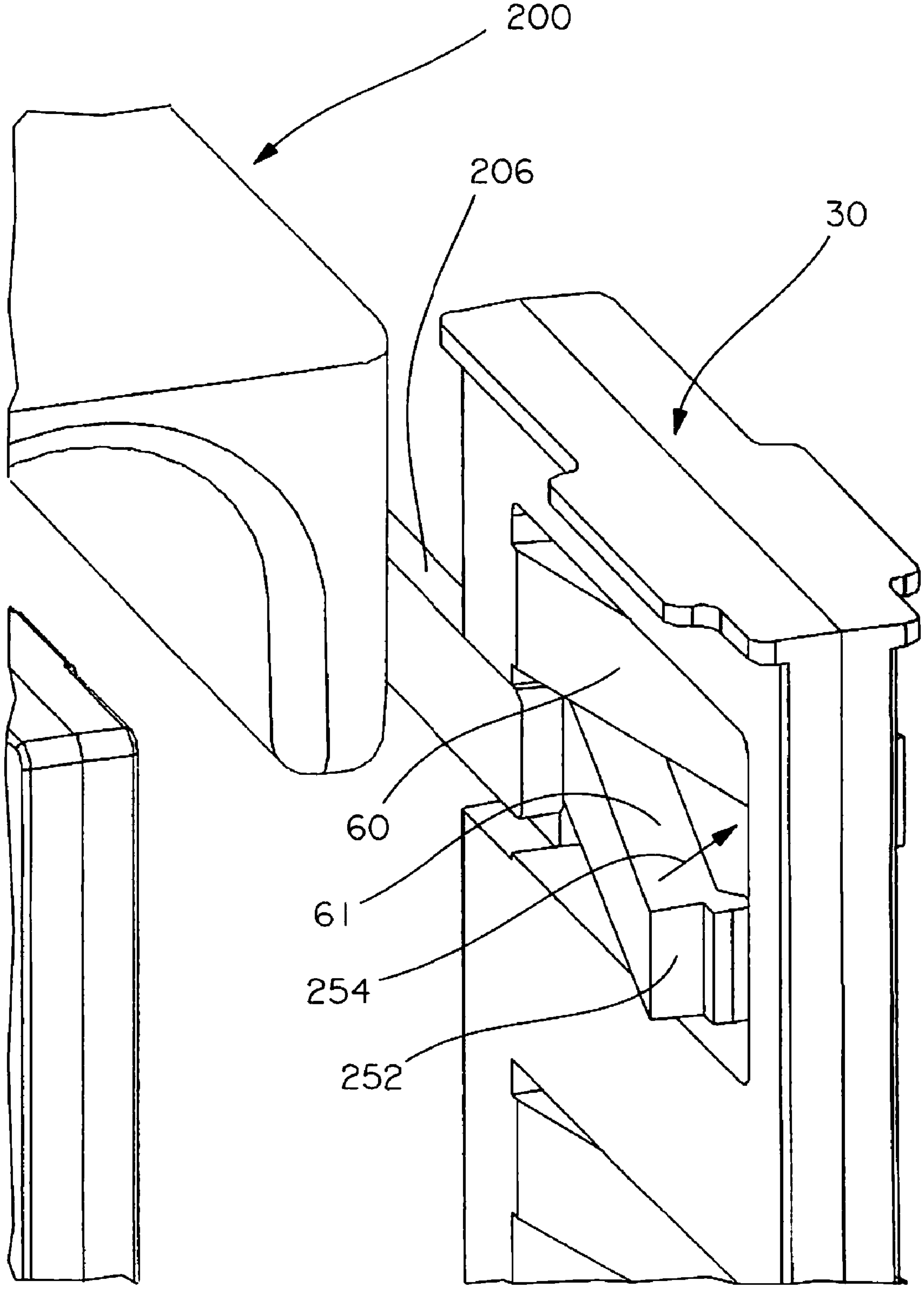
FIG. 31 is a partial enlarged view of a front end of a latch release finger of the tool engaging a tab of a locking or housing clip.

With plug 14*b* unlocked from its electrical connection, plug 14*b* still cannot be removed from cassette 10 since plug 14*b* is blocked by front edge 252 of tab 61 of housing clip 30 abutting a rear portion of plug 14*b* as demonstrated in FIG. 31. Tab 61 in its blocking position with plug 14*b*, is positioned to extend within slot 246. Thus, as actuator 210 extends latch release finger 206 within slot 246 with finger 208 abutting rear wall 231, a front edge of finger 206 engages tab 61 and pushes tab 61 in direction indicated by arrow 254, away from slot 246 and away from a blocking position behind plug 14*b*. With tab 61 pushed out of the way of plug 14*b*, plug 14*b* is unlocked from a locked position within cassette 10.

Thus, with probe 204 depressing latch 64*b* of plug 14*b* and latch release finger 206 pushing tab 61 out of blocking relationship with plug 14*b*, plug 14*b* is ready for removal from cassette assembly 10. The user in first selecting the plug to be removed places the cord, which is attached to plug 14*b* (the plug to be removed), into groove 256 defined in a bottom portion of housing 202, shown in FIGS. 24 and 28. Thus, the user's hand that grasps tool 200 during employment of the tool, may be used to grasp the cord corresponding with the plug that is being removed. With plug 14*b* unlocked from electrical connection and unlocked from cassette assembly 10, the user pulls tool 200 away from cassette assembly 10 while at the same time grasping the cord of plug 14*b*, and plug 14*b* pulls out of cassette assembly 10. As a result, any of plugs 16 *a-f* can be unlocked and removed one at a time from cassette assembly 10 with tool 200 regardless of whether or not the cassette is engaged in the switch.

While particular examples of the present invention have been shown and described, it will be obvious to those skilled in the relevant art that changes and modifications may be made without departing from the invention in its broader aspects. For example, while the present invention has been described in terms of patch cord cables and plugs connected to switches, this invention is applicable to virtually any combination of plug and socket combinations for transmitting electrical signals. The matter set forth in the foregoing description and accompanying drawings is offered by way of illustration only and not as a limitation.

The invention claimed is:

1. A plug unlocking tool, comprising:
- a housing;
- a probe connected to the housing wherein the probe extends in a direction away from the housing;
- first and second latch release fingers associated with the housing wherein the first and second latch release fingers are movable relative to the housing; and
- an actuator positioned within and moveable along a slot defined in the housing wherein the actuator is associated with the first and second latch release fingers to impart movement of at least one of the first and second latch release fingers with movement of the actuator along the slot.

2. The plug unlocking tool of claim 1 wherein the housing comprises an elongated shape.

3. The plug unlocking tool of claim 2 wherein the probe comprises an elongated shape wherein a length of the probe extends in the direction.

4. The plug unlocking tool of claim 1 wherein the probe is stationary relative to the housing.

5. The plug unlocking tool of claim 1 wherein the probe is dimensioned to fit within a slot defined by a plug cassette assembly for engaging a latch of a tangle free plug for unlocking the plug from an electrical connection.

6. The plug unlocking tool of claim 1 wherein the first and second latch release fingers extend in the direction away from the housing.

7. The plug unlocking tool of claim 1 wherein the first and second latch release fingers are spaced apart and are each spaced apart from the probe.

8. The plug unlocking tool of claim 7 wherein the first and second latch release fingers are each positioned at a different elevation relative to the probe.

9. The plug unlocking tool of claim 1 wherein the first latch release finger is positioned within a first slot secured to the housing and the second latch release finger is positioned within a second slot secured to the housing wherein each of the first and second release fingers are slidable within the first and second slots respectively.

10. The plug unlocking tool of claim 1 further comprising a row of slots defined within a portion of each of the first and second latch release fingers.

11. The plug unlocking tool of claim 10 further comprising a first wall secured to the housing and positioned in a path of movement of the first latch release finger to block movement of the first latch release finger in a direction opposite to the direction and a second wall secured to the housing and positioned in a path of movement of the second latch release finger to block movement of the second latch release finger in a direction opposite to the direction.

12. The plug unlocking tool of claim 10 wherein the portion defining the row of slots of first latch release finger is spaced apart from the portion defining the row of slots of the second latch release finger.

13. The plug unlocking tool of claim 12 further comprising a gear positioned between the portions of the first and second latch release fingers, wherein a tooth of the gear engages a slot in the row of slots in the portion of the first latch release finger and an opposing tooth of the gear engages a slot in the in the row of slots in the portion of the second latch release finger portion and further comprising an axle positioned through an axis of rotation of the gear wherein the axle is secured to the actuator.

14. The plug unlocking tool of claim 13 wherein movement of the actuator imparts simultaneous movement to each of the first and second latch release fingers in the direction.

15. The plug unlocking tool of claim 13 wherein movement of the actuator, with one of the first and second latch release fingers blocked from movement, a force is imparted to the blocked finger in a direction opposite to the direction and a force is imparted to the other finger in the direction resulting in movement of the other finger in the direction.

16. The plug unlocking tool of claim 1 wherein each of the first and second latch release fingers are dimensioned to fit within another slot defined within a plug cassette assembly to allow one of the first and second latch release fingers to engage a locking clip positioned within the plug cassette assembly for unlocking the plug from the assembly.

17. The plug unlocking tool of claim 1 further comprising a spring positioned between a stop wall secured to the actuator and a stop wall secured to the housing wherein the spring is placed into compression with the actuator moved in the direction.

18. The plug unlocking tool of claim 1 wherein the housing defines a groove for receiving a cord connected to the plug.

* * * * *